United States Patent
Stahlhut et al.

(10) Patent No.: US 11,138,488 B2
(45) Date of Patent: Oct. 5, 2021

(54) ORGANIC LIGHT EMITTING DIODE ("OLED") SINGLE-USE PAYMENT INSTRUMENT

(71) Applicant: Bank of America Corporation, Charlotte, NC (US)

(72) Inventors: William August Stahlhut, The Colony, TX (US); Kamesh R. Gottumukkala, Concord, CA (US); Siten Sanghvi, Jersey City, NJ (US)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 16/452,885

(22) Filed: Jun. 26, 2019

(65) Prior Publication Data

US 2020/0410314 A1    Dec. 31, 2020

(51) Int. Cl.

| | |
|---|---|
| *G06K 19/00* | (2006.01) |
| *G06K 19/077* | (2006.01) |
| *G06F 21/62* | (2013.01) |
| *G06Q 20/34* | (2012.01) |
| *G06Q 20/38* | (2012.01) |
| *G06Q 20/20* | (2012.01) |

(52) U.S. Cl.
CPC ... *G06K 19/07749* (2013.01); *G06F 21/6245* (2013.01); *G06Q 20/204* (2013.01); *G06Q 20/341* (2013.01); *G06Q 20/353* (2013.01); *G06Q 20/385* (2013.01)

(58) Field of Classification Search
CPC ........ H01L 2924/00014; G06Q 20/341; G06Q 20/34; G06Q 20/36; G06F 21/32; G06F 21/31; G06F 21/35

USPC .................................... 235/487, 492; 705/17
See application file for complete search history.

(56) References Cited

U.S. PATENT DOCUMENTS

| | | | |
|---|---|---|---|
| 2,912,066 | A | 11/1959 | Ellithorpe |
| 3,703,864 | A | 11/1972 | Bradford |
| 3,946,206 | A | 3/1976 | Darjany |
| 4,372,225 | A | 2/1983 | Tissot et al. |
| 4,557,352 | A | 12/1985 | Tschappat, Jr. |
| 4,953,326 | A | 9/1990 | Wexler et al. |
| 4,968,873 | A | 11/1990 | Dethloff et al. |

(Continued)

FOREIGN PATENT DOCUMENTS

| | | |
|---|---|---|
| DE | 102009028991 | 5/2011 |
| EP | 0827066 | 3/1998 |
| WO | WO2013131153 | 9/2013 |

OTHER PUBLICATIONS

Conor Gaffey, "World's Smallest Nano Chip will Double Processing Power of Smartphones," https://www.newsweek.com/worlds-smallest-nano-chip-will-double-processing-power-smartphones-330062, Jul. 9, 2015.

(Continued)

*Primary Examiner* — Daniel St. Cyr
(74) *Attorney, Agent, or Firm* — Weiss & Arons LLP; Michael A. Springs, Esq.

(57) ABSTRACT

Aspects of the invention relate to components for constructing a payment instrument that includes enhanced electronic features. Apparatus may include an all-inclusive smart card that securely stores sensitive data. Such sensitive data may include credit card, driver's license or passport information. The smart card may generate disposable card numbers for online or offline onetime transactions.

19 Claims, 9 Drawing Sheets

(56) References Cited

U.S. PATENT DOCUMENTS

| | | |
|---|---|---|
| 5,168,354 A | 12/1992 | Martinez et al. |
| 5,313,051 A | 5/1994 | Brigida et al. |
| 5,539,819 A | 7/1996 | Sonoyama et al. |
| 5,693,956 A | 12/1997 | Shi et al. |
| 5,734,154 A | 3/1998 | Jachimowicz et al. |
| 5,770,849 A | 6/1998 | Novis et al. |
| 5,970,888 A | 10/1999 | Sheppard |
| 6,015,092 A | 1/2000 | Postlewaite et al. |
| 6,057,646 A | 5/2000 | Pieroth et al. |
| 6,173,899 B1 | 1/2001 | Rozin |
| 6,394,343 B1 | 5/2002 | Berg et al. |
| 6,724,103 B2 | 4/2004 | Parrault |
| 7,025,277 B2 | 4/2006 | Forrest et al. |
| 7,270,276 B2 | 9/2007 | Vayssiere |
| 7,357,315 B2 | 4/2008 | Vergara et al. |
| 7,360,682 B2 | 4/2008 | Shane et al. |
| 7,360,691 B2 | 4/2008 | Takayama |
| 7,461,774 B2 | 12/2008 | Vergara et al. |
| 7,523,856 B2 | 4/2009 | Block et al. |
| 7,588,183 B2 | 9/2009 | Shane et al. |
| 7,791,559 B2 | 9/2010 | Piasecki |
| 7,814,016 B2 | 10/2010 | Pranger |
| 7,856,116 B2 | 12/2010 | Rodriguez et al. |
| 7,940,159 B2 | 5/2011 | Clemens et al. |
| 7,992,789 B2 | 8/2011 | Borracci |
| 8,237,068 B2 | 8/2012 | Szaikowski |
| 8,243,596 B2 | 8/2012 | Fedders et al. |
| 8,244,874 B1 | 8/2012 | Thireault |
| 8,276,823 B2 | 10/2012 | Chen |
| 8,282,007 B1 | 10/2012 | Cloutier et al. |
| 8,317,094 B2 | 11/2012 | Lehman |
| 8,378,932 B2 | 2/2013 | Fein et al. |
| 8,392,965 B2 | 3/2013 | Carter et al. |
| 8,399,889 B2 | 3/2013 | Wu et al. |
| 8,413,893 B2 | 4/2013 | Kim |
| 8,471,782 B2 | 6/2013 | Muklashy et al. |
| 8,479,981 B2 | 7/2013 | Carmichael et al. |
| 8,523,059 B1 | 9/2013 | Mullen et al. |
| 8,540,151 B1 | 9/2013 | Snyder et al. |
| 8,678,293 B2 | 3/2014 | Chen |
| 8,756,680 B2 | 6/2014 | Shashidhar |
| 8,810,816 B2 | 8/2014 | Fischer et al. |
| 8,820,638 B1 | 9/2014 | Cotter et al. |
| 9,250,657 B2 | 2/2016 | Kim et al. |
| 9,470,404 B2 | 10/2016 | Lee et al. |
| 9,491,879 B2 | 11/2016 | Cheng et al. |
| 9,538,127 B2 | 1/2017 | Gish |
| 9,577,216 B2 | 2/2017 | Fujino et al. |
| 9,747,539 B1* | 8/2017 | Kendall ............... G07F 7/0846 |
| 9,805,361 B2* | 10/2017 | Park ...................... G06Q 20/385 |
| 9,900,725 B2 | 2/2018 | Young et al. |
| 10,043,183 B2* | 8/2018 | Kurian ................. G06Q 20/341 |
| 10,056,048 B2 | 8/2018 | Kim |
| 10,713,649 B1* | 7/2020 | Rule .................... G06Q 20/341 |
| 2001/0007332 A1 | 7/2001 | Kjonaas et al. |
| 2003/0145205 A1 | 7/2003 | Sarcanin |
| 2003/0208405 A1 | 11/2003 | Putman et al. |
| 2005/0064936 A1 | 3/2005 | Pryor |
| 2005/0102499 A1 | 5/2005 | Kosuga et al. |
| 2005/0134461 A1 | 6/2005 | Gelbman et al. |
| 2005/0173518 A1 | 8/2005 | Takayama |
| 2005/0263590 A1 | 12/2005 | Branck et al. |
| 2006/0016884 A1 | 1/2006 | Block et al. |
| 2006/0091223 A1 | 5/2006 | Zellner et al. |
| 2006/0131393 A1 | 6/2006 | Cok et al. |
| 2006/0261174 A1 | 11/2006 | Zellner et al. |
| 2006/0289629 A1 | 12/2006 | Smith et al. |
| 2007/0115202 A1 | 5/2007 | Kiesenhofer |
| 2007/0273507 A1 | 11/2007 | Burchell et al. |
| 2007/0279315 A1 | 12/2007 | Laves et al. |
| 2008/0035736 A1 | 2/2008 | Tompkin et al. |
| 2008/0105751 A1 | 5/2008 | Landau |
| 2008/0158150 A1 | 7/2008 | Rossman et al. |
| 2009/0039154 A1 | 2/2009 | Williams et al. |
| 2009/0278452 A1 | 11/2009 | Kim |
| 2009/0298546 A1 | 12/2009 | Kim et al. |
| 2009/0314840 A1 | 12/2009 | Granucci et al. |
| 2010/0084476 A1 | 4/2010 | Zellner et al. |
| 2010/0260388 A1 | 10/2010 | Garrett et al. |
| 2010/0302206 A1 | 12/2010 | Yu et al. |
| 2011/0058113 A1 | 3/2011 | Threlkel et al. |
| 2011/0060640 A1 | 3/2011 | Thompson et al. |
| 2011/0140841 A1 | 6/2011 | Bona et al. |
| 2011/0148944 A1 | 6/2011 | Kobayashi |
| 2011/0164047 A1 | 7/2011 | Pance |
| 2011/0178928 A1 | 7/2011 | Carmichael et al. |
| 2011/0241996 A1 | 10/2011 | Vesely |
| 2012/0019434 A1 | 1/2012 | Kuhlman et al. |
| 2012/0253852 A1* | 10/2012 | Pourfallah ........... G06Q 20/405 705/4 |
| 2012/0268762 A1 | 10/2012 | Fischer et al. |
| 2012/0274727 A1 | 11/2012 | Robinson et al. |
| 2012/0280924 A1 | 11/2012 | Kummer et al. |
| 2013/0162594 A1 | 6/2013 | Paulsen et al. |
| 2013/0221112 A1 | 8/2013 | Lai et al. |
| 2013/0232082 A1 | 9/2013 | Krawczewicz et al. |
| 2013/0341394 A1 | 12/2013 | Seo et al. |
| 2014/0007002 A1 | 1/2014 | Chang et al. |
| 2014/0081729 A1 | 3/2014 | Ocher |
| 2014/0093144 A1 | 4/2014 | Feekes |
| 2014/0114861 A1 | 4/2014 | Mages et al. |
| 2014/0118415 A1 | 5/2014 | Seo |
| 2014/0172700 A1 | 6/2014 | Teuwen et al. |
| 2014/0226275 A1 | 8/2014 | Ko et al. |
| 2014/0267960 A1 | 9/2014 | Ward |
| 2014/0291406 A1 | 10/2014 | Ko |
| 2014/0337957 A1 | 11/2014 | Feekes |
| 2014/0339315 A1 | 11/2014 | Ko |
| 2014/0353384 A1 | 12/2014 | Hoegerl et al. |
| 2014/0374494 A1 | 12/2014 | Seo |
| 2015/0069126 A1 | 3/2015 | Leon |
| 2015/0077646 A1 | 3/2015 | Chen et al. |
| 2015/0179025 A1 | 6/2015 | Cowell |
| 2015/0262052 A1 | 9/2015 | Pahuja |
| 2016/0004945 A1 | 1/2016 | Wade |
| 2016/0027391 A1 | 1/2016 | Gibson et al. |
| 2016/0054479 A1 | 2/2016 | Ho et al. |
| 2016/0085325 A1 | 3/2016 | Lee et al. |
| 2016/0098700 A1 | 4/2016 | Johnson et al. |
| 2016/0098709 A1 | 4/2016 | Johnson et al. |
| 2016/0171461 A1 | 6/2016 | Hoover et al. |
| 2016/0210453 A1 | 7/2016 | Seo et al. |
| 2016/0219046 A1 | 7/2016 | Ballard et al. |
| 2016/0224528 A1 | 8/2016 | Trevarthen et al. |
| 2016/0254336 A1 | 9/2016 | Zhang et al. |
| 2016/0307089 A1 | 10/2016 | Wurmfeld et al. |
| 2017/0032235 A1* | 2/2017 | Cohen .............. G06K 19/07327 |
| 2017/0103718 A1 | 4/2017 | Miller |
| 2017/0161709 A1* | 6/2017 | Tunnell ................. G06Q 20/20 |
| 2017/0185991 A1* | 6/2017 | Park ...................... H04W 4/023 |
| 2017/0357979 A1* | 12/2017 | Khurana ............. H04L 63/0853 |
| 2018/0121891 A1 | 5/2018 | Hosny et al. |
| 2018/0167445 A1 | 6/2018 | Speight et al. |
| 2018/0367314 A1 | 12/2018 | Egner et al. |
| 2019/0026450 A1 | 1/2019 | Egner et al. |
| 2019/0050556 A1* | 2/2019 | Yoo ......................... G06F 21/45 |
| 2019/0050849 A1* | 2/2019 | Yoo ...................... G06Q 20/351 |

OTHER PUBLICATIONS

Schott Innovation, http://www.us.schott.com/innovation/ultrathinglass/, Retrieved on Sep. 14, 2016.
"Schott's Reliable and Strong Ultra-Thin Glass Features in Fingerprint Sensors in new Smartphones," http://www.us.schott.com/english/news/press.html?NID=us616, Retrieved on Sep. 14, 2016.
Ron Mertens, "The OLED Handbook, A Guide to OLED Technology, Industry & Market," http://www.gbv.de/dms/tib-ub-hannover/82342913x.pdf, 2015 Edition.
Bryce Kellogg et al., "Passive Wi-Fi: Bringing Low Power to Wi-Fi Transmissions," http://passivewifi.cs.washington.edu/files/passive_wifi.pdf, Retrieved on May 11, 2016.
Ron Mertens, "SecureCard—A New Secure Credit Card Technology, Utilizing an OLED Display", https://www.oled-info.com/

(56) References Cited

OTHER PUBLICATIONS securecard_a_new_secure_credit_card_technology_utilizing_an_oled_display, Metalgrass Software, Nov. 21, 2006.
John Wehr, "Card Size Specifications: When Does Card Size Matter?" https://www.secureidnews.com/news-item/card-size-specifications-when-does-card-size-matter/, Jan. 1, 2002.
Zachary Shahan, "Ultra-Thin-Solar-Cell Company Unstealths, Aims to Cut Cost of Solar Cells in Half!" https://cleantechnica.com/2012/03/14/ultra-thin-solar-cell-company-unstealths-aims-to-cut-cost-of-solar-cells-in-half-images/, Sustainable Enterprises Media, Inc., Mar. 14, 2012.
"ISO Magnetic Stripe Card Standards," https://www.q-card.com/about-us/iso-magnetic-stripe-card-standards/page.aspx?id=1457, Retrieved on Jul. 18, 2016.
"Coin Vs. Plastic: Which Credit Card Consolidation Tool is the Best?" http://payprotec.com/coin-vs-plastc-which-credit-card-consolidation-tool-is-the-best/, PayProTec, Retrieved on Apr. 7, 2016.
"Tiny Batteries Could Revolutionize Green Energy," http://news.nationalgeographic.com/news/energy/2014/11/141117-nanotechnology-for-better-batteries, National Geographic Society, Nov. 14, 2011.
"Yubikey 4 & Yubikey 4 Nano," https://web.archive.org/web/20160328131338/https://www.yubico.com/products/yubikey-hardware/yubikey4/ Yubico, Retrieved on Apr. 7, 2016.
"Magnetic Stripe Card Standards," https://www.magtek.com/content/dosumentationfiles/d99800004.pdf, MagTek Inc., Retrieved on Apr. 20, 2016.
"A Power-Harvesting Pad-Less mm-sized 24/60GHz Passive Radio With On-Chip Antennas," https://www.researchgate.net/publication/269292818_A_power-harvesting_pad-less_mm-sized_2460GHz_passive_radio_with_on-chip_antennas, IEEE, Retrieved on Apr. 19, 2016.
"Magnetic Stripe Card Recommendations," 3M Library Systems, Dec. 1998.
"Plastic Card Manufacturing Including Magnetic Stripe Tapelaying," http://allsafe.com/pdfs/magoverlay.pdf, Allsafe Technologies, Retrieved on Apr. 20, 2016.
Paul Buckley, "Flexible OLED Displays Target Volume Production in 2015," https://www.eenewsled.com/news/flexible-oled-displays-target-volume-production-2015, Feb. 5, 2015.
"MAX2837—2.3GHz to 2.7GHz Wireless Broadband RF Transceiver," https://www.maximintegrated.com/en/products/comms/wireless-rf/MAX2837.html, Maxim Integrated, Retrieved on May 30, 2016.
"Ultrathin Rechargeable Lithium Polymer Batteries from PowerStream," https://www.powerstream.com/thin-lithium-ion.htm, Lund Instrument Engineering, Inc., Apr. 5, 2016.
Tom Abate, "Stanford Engineers Aim to Connect the World with Ant-Sized Radios," https://news.stanford.edu/news/2014/september/ant-radio-arbabian-090914.html, Stanford University, Sep. 9, 2014.
"Ultra-Thin Flexible Glass", http://www.schott.com/advanced_optics/english/syn/advanced_optics/products/wafers-and-thin-glass/glass-wafer-and-substrates/ultra-thin-glass/index.html, Schott AG, Retrieved on May 30, 2016.
Jennifer Langston, "UW Engineers Achieve Wi-Fi at 10,000 Times Lower Power," http://www.washinston.edu/news/2016/02/23/uw-engineers-achieve-wi-fi-at-10000-times-lower-power/, University of Washington, Feb. 23, 2016.
Ron Mertens, "New All-In-One Credit Card Concept," https://www.oled-info.com/new-all-one-credit-card-concept, Metalgrass Software, Oct. 29, 2009.
"Wi-Fi," Wikimedia Foundation, Inc., https://en.wikipedia.org/wiki/Wi-Fi, Apr. 12, 2016.
"Ant-Sized IoT Radio," https://web.stanford.edu/~arbabian/Home/IoT_Radio.html, Stanford News, Retrieved on Jul. 18, 2016.
Nick Pino, "Samsung's Latest OLED Can be a Mirror, a Window, or a TV,", https://www.techradar.com/news/television/samsung-s-latest-oled-screen-can-be-a-mirror-a-window-or-a-tv-1296418, Future US, Inc., Jun. 11, 2015.
"Pneumatic Tube," https://en.wikipedia.org/wiki/Pneumatic_tube, Wikimedia Foundation, Inc., Mar. 11, 2016.
"New Virtual Tellers," http://www.frontierbk.com/services-tools/convenience-services/new-interactive-tellers.html, Frontier Bank, Retrieved on Jun. 6, 2016.
Dario Borghino, "High-Tech Light Shutter Could Help Turn Your Windows into LCD Displays," http://www.gizamag.com/transparent-oled-display/37262/, Gizmag, May 1, 2015.
L. Zhao et al. "Novel Method for Fabricating Flexible Active Matrix Organic Light Emitting Diode (AMOLED) Displays," https://pdfs.semanticscholar.org/1eb5/d0be006ae57dfeb0cbaa8ac4ec1a56c59a19.pdf, Hewlett-Packard Development Company, L.P., Sep. 21, 2011.
Amar Toor, "LG Unveils Flexible Plastic E-paper Display, Aims for European Launch Next Month,"https://www.engadget.com/2012/03/29/lg-flexible-e-paper-display-launch/, Mar. 29, 2012.
Martyn Williams, "Samsung, LG Show Flexible OLED, E-Paper Screens," http://www.pcworld.com/article/210379/article.html, PCWorld, Nov. 10, 2010.
"Electronic Paper," https://en.wikipedia.org/wiki/Electronic_paper, Wikimedia Foundation, Inc., Jun. 10, 2016.
"E Ink," https://en.wikipedia.org/wiki/E_Ink, Wikimedia Foundation, Inc., Jun. 8, 2016.
"Ink Technology: Electrophoretic Ink, Explained," http://www.eink.com/technology.html, E Ink Holdings, Inc., Retrieved on Jun. 20, 2016.
"Are Toeprints Unique, Like Fingerprints?" http://www.sciencefocus.com/qa/are-toeprints-unique-fingerprints, Science Focus, Retrieved on Jun. 23, 2016.
Sampath Srinivas et al., "Universal $2^{nd}$ Factor (U2F) Overview", https://fidoalliance.org/specs/fido-u2f-v1.1-id-20160915/fido-u2f-overview-v1.1-id-20160915.html, FIDO Alliance, May 14, 2015.
"Sonavation Announces Fingerprint Imaging Through Smart Phone OLED Display," http://blog.sonavation.com/index.php/2016/02/22/sonavation-announces-fingerprint-imaging-through-smart-phone-oled-display-2/, Feb. 22, 2016.
Dario Borghino, "Wearable Thermoelectric Generator Could Extend Your Smartwatch's Battery Life", https://newatlas.com/wearable-thermoelectric-generator/31617/, Gizmag, Apr. 14, 2014.
"Inductive Charging", https://en.wikipedia.org/wiki/Inductive_charging, Wikimedia Foundation, Inc., May 6, 2016.
"Near Field Communication", https://en.wikipedia.org/wiki/Near-field_communication, Wikimedia Foundation, Inc., Apr. 29, 2016.
Sumi Das, "A Keyboard that Rises Up From Flat Touch Screens," https://www.cnet.com/news/a-keyboard-that-rises-up-from-flat-touch-screens/, Feb. 13, 2013.
Jessica Leber, "A Shape-Shifting Smartphone Touch Screen," https://www.technologyreview.com/s/508106/a-shape-shifting-smartphone-touch-screen/, Dec. 3, 2012.
Matthew Frankel, "Could This Be the Bank of the Future?" https://www.fool.com/investing/general/2014/11/09/could-this-be-the-bank-of-the-future.aspx, The Motley Fool, Nov. 9, 2014.
"Contactless Payment," https://en.wikipedia.org/wiki/Contactless_payment, Wikimedia Foundation, Inc., Jul. 27, 2016.
Zhiquin Chen, "Java Card Technology for Smart Cards: Architecture and Programmer's Guide-Smart Card Basics," pp. 11-14, Copyright 2000, Sun Microsystems, Inc., Palo Alto, California.
Mary Shacklett, "Edge Computing: A Cheat Sheet," https://www.techrepublic.com/article/edge-computing-the-smart-persons-guide/, Jul. 21, 2017.
Paul Miller, "What is Edge Computing?" https://www.theverge.com/circuitbreaker/2018/5/7/17327584/edge-computing-cloud-google, May 7, 2018.
"What is Edge Computing," https://www.ge.com/digital/blog/what-edge-computing, GE Digital, Retrieved on May 16, 2019.
Parham P. Khial, "Nanophotonic Optical Gyroscope with Reciprocal Sensitivity Enhancement," https://www.researchgate.net/publication/328154712_Nanophotonic_optical_gyroscope_with_reciprocal_sensitivity_enhancement, Springer Nature Limited, Nov. 2018.
Cory Bohon, Apple Pay: A Cheat Sheet, https://www.techrepublic.com/article/apple-pay-the-smart-persons-guide/, TechRepublic, Mar. 27, 2019.
"Apple Pay Security and Privacy Overview," https://support.apple.com/en-us/HT203027, Apple, Inc., Feb. 19, 2019.

(56) References Cited

OTHER PUBLICATIONS

"Apple Pay: All Your Questions Answered," https://www.macrumors.com/roundup/apple-pay/, MacRumors.com, LLC., May 30, 2019.
David Nield, "Tiny Gyroscope the Size of a Grain of Rice Could Help Shrink Gadgets Even Further," https://newatlas.com/tiny-optical-gyroscope-grain-of-rice/56976/, Gizmag PTY LTD., Oct. 28, 2018.

* cited by examiner

ORGANIC LIGHT EMITTING DIODE ("OLED") SINGLE-USE PAYMENT INSTRUMENT

FIELD OF TECHNOLOGY

Aspects of the disclosure relate to a payment instrument that includes enhanced security features.

BACKGROUND

Mobile devices, such as smartphones are becoming ubiquitous tools. Mobile devices are used for a variety of purposes, including social and work related tasks. Due to increased use and adoption, users regularly carry mobile devices. However, mobile devices are an additional item that must fit into increasingly crowded user pockets.

In addition to a mobile device, users typically carry other items in their pockets. For example, users may carry a wallet that includes cash, checks and identification cards. Identification cards may include insurance cards and a driver's license. When travelling, a user may also carry a passport. The user may also carry payment instruments such as credit and debit cards.

Efforts have been made to streamline the number of items carried in a user's pocket. For example, protective cases for mobile devices may include integrated pockets for holding identification cards and clips for holding checks and cash. Protective cases with integrated pockets may eliminate the need for a user to carry a separate wallet holding identification cards and cash. However, such cases do not reduce the number of identification cards that may need to be carried by the user. It would be desirable to further reduce the total number of items carried in pockets.

Furthermore, carrying multiple identification cards or payment instruments may be associated with risks. Typically, sensitive data is printed on a face (front or back) of identification cards and payment instruments. The sensitive data may include a unique identification number, a card holder's name, an expiration date of the credit card number, an amount, a name, expiration date, a card verification value ("CVV"), an identification number or any other suitable sensitive data.

The sensitive data may be visible to an onlooker who may obtain a copy (e.g., by taking a picture) of the sensitive data. The copied sensitive data may be used to initiate fraudulent transactions or impersonate the user. It would be desirable to leverage technology to design identification cards and payment instruments that are more protective of sensitive data associated with these items.

However, the relevant form factor associated with these items is limited. For example, payment instruments are typically 85.60 millimeters ("mm")×53.98 mm×0.8 mm. This limited form factor allows payments instruments to fit easily into a wallet or pocket. Yet, this form factor also presents design challenges.

An exemplary design challenge involves the difficulty of attempting to include electronic features within this limited form factor. Furthermore, users typically expect to be able to fold or bend identification cards or payment instruments. For example, a user may expect to fold a check and store a payment instrument in a wallet or pocket.

It would be desirable to provide identification cards and purchasing instruments that more securely protect sensitive data. It would be desirable to provide identification cards and purchasing instruments that incorporate electronic features that allow for efficient use and functionality of such items. It would be desirable to provide identification cards and purchasing instruments that include electronic features and allows users to fold or bend these items.

Accordingly, it would be desirable to provide systems and methods for organic light emitting diode ("OLED") single-use payment instrument.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
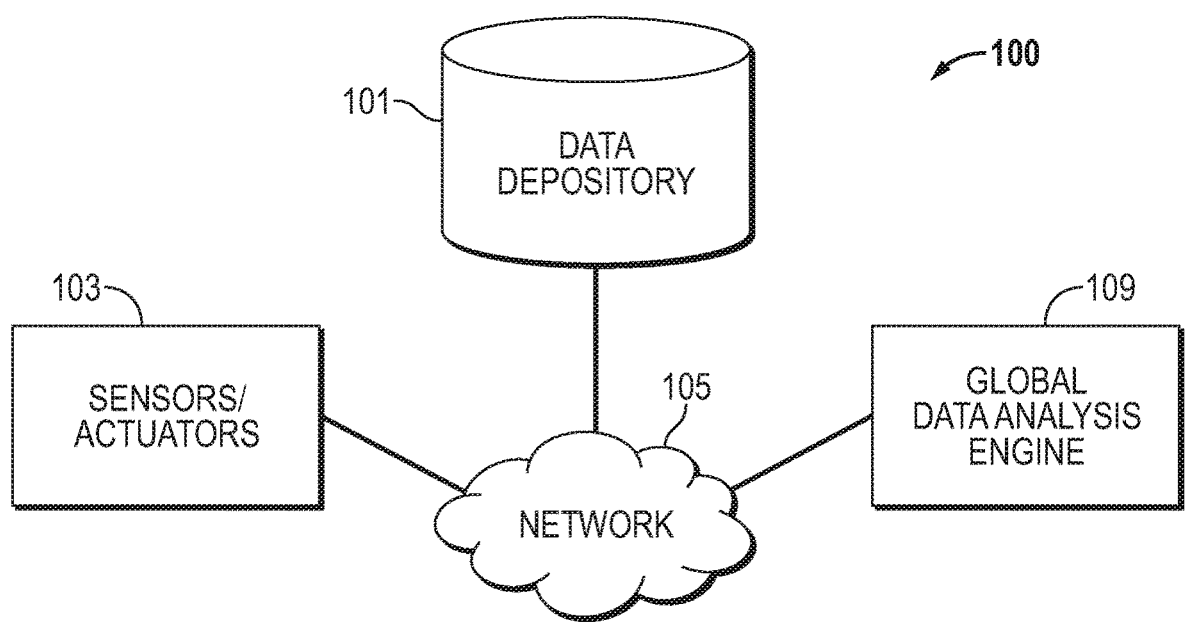
FIG. 1 shows an illustrative system in accordance with principles of the disclosure.

Aspects of the invention relate to a smart card that enhances security of sensitive data included on conventional cards typically carried by user in a wallet. Conventional cards may include credit cards, debit cards, passports, checks, driver's license and insurance cards. The smart card may be a credit-card-size device. The smart card may include organic light emitting diode ("OLED") technology.

OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

OLEDs may also be used to construct a display that is flexible. OLED displays may be folded, bent or rolled. An exemplary smart card as described herein may be passed through a check reader that typically bends a paper check when reading the check. The OLED display may be configured to present information on a face of the smart card such that the smart card presents information that is formatted and positioned on the face of the smart card as expected by card readers that typically read conventional cards.

Furthermore, OLEDs may be used to construct a display that consumes less power compared to other display technologies. For example, in a Liquid Crystal Display (hereinafter, "LCD") power must be supplied to the entire backlight to illuminate just one pixel in the display. In contrast, an OLED display does not necessarily include a backlight. Furthermore, in an OLED display, preferably, only the illuminated pixel draws power.

Therefore, power efficiency of OLED technology presents a possibility for designing smart cards that provide enhanced security and functionality. As used herein, a smart card may function as any suitable payment instrument. Suitable payment instruments may include a credit card, check, checks, debit card and any suitable payment instrument. Suitable payment instruments may include payment instruments that conform to specifications published by the International Organization for Standardization. Illustrative specifications include: ISO/IEC 7810, ISO/IEC 7811 and ISO/IEC 7816, which are hereby incorporated herein by reference in their respective entireties.

The smart card may not present any sensitive data printed or embossed on a face of a conventional card. Rather, sensitive data may be electronically stored within the smart card. Sensitive data may be stored within a designated chipset embedded on the smart card.

The designated chipset may apply encryption techniques to the sensitive data. Storing sensitive data on the designated chipset may isolate the sensitive data from executable instructions stored elsewhere on the smart card. The designated chipset may be configured to delete sensitive data stored thereon in response to detecting tampering with the designated chipset. Tampering may include physical tampering and electronic tampering.

Sensitive data stored within the smart card may only be visible when presented on a display of the smart card. A user may add sensitive data and thereby store a new payment instrument on the smart card. The smart card may store sensitive data associated with two or more payment instruments. The smart card may store sensitive data associated with two or more identification cards.

For example, the smart card may store sensitive information associated with a driver's license, passport and insurance card. Storing sensitive information associated with multiple conventional cards on the smart card may reduce a total number of items a user needs to carry in their pocket.

The smart card may be configured to display sensitive data in response to pre-determined conditions. In response to detection of certain conditions, specific instances of sensitive data stored on the smart card may be disabled and unavailable for display. In some embodiments, specific instances of sensitive data may only be displayed in encrypted form.

In some embodiments, the smart card may be configured to generate a one-time code. The one-time code may be generated based on sensitive data stored on the smart card. The one-time code may only be readable by a machine.

The one-time code may be a one-time public representation of sensitive data stored on the smart card. The one-time public representation may be displayed for online or offline one-time transactions. The one-time public representation may not be used for a second transaction. Use of one-time public representations may secure the sensitive data. Use of a one-time public representation may reduce a risk the sensitive data will be compromised and fraudulently used. The one-time public representation may only be used within a predetermined geographic region or within a predetermined time interval.

An OLED display may be touch-sensitive. The user may select sensitive data stored on the smart card by touching a displayed representation of the sensitive data. Some embodiments may include an OLED display on front and back faces of the smart card. Some embodiments may include an OLED display on a thickness of the smart card. The OLED display may enable video playback capability.

In response to a user selection, or in response to certain pre-determined conditions, sensitive data stored on the smart card may be deleted or purged from the smart card. For example, sensitive data may be deleted in response to expiration of sensitive data. Sensitive data may be deleted in response to detecting a potential security breach.

The smart card may include one or more biometric sensors. Illustrative biometric sensors may include a fingerprint scanner, camera, microphone or any other suitable sensor for capturing a biometric feature. To authorize presentation of sensitive data on a smart car, a user may present a biometric credential to the biometric sensor for verification. The smart card may only authorize release of the sensitive data after verifying a submitted biometric feature.

The smart card may enable more secure financial transactions. For example, online banking transactions may be made more secure by requiring entry of a valid biometric feature, such as a fingerprint, prior to authorizing a transaction or accessing an online banking portal. Embodiments may utilize a camera to verify a biometric feature or identity of a user prior to authorizing a transaction or presenting sensitive data.

A location of the smart card may be detected based on an access point used by the smart card to access a network. In some embodiments, the smart card may include a global positioning system ("GPS") chip for receiving and/or transmitting GPS signals and determining GPS coordinates. In some embodiments, the smart card may include cellular telecommunication capabilities. A location of the smart card may be determined using cellular triangulation techniques. In some embodiments, the cellular telecommunication capabilities may only be used to determine a location of the smart card.

In some embodiments, a terminal, such as an automated teller machine ("ATM") or point-of-sale ("POS") system may include a card reader that detects light, color or a pattern presented on an OLED display of the smart card. A presented pattern may include a quick response ("QR") code. In some embodiments, such light or color patterns may be used by the smart card to present sensitive data to a card reader in a way that reduces a risk of exposure of the sensitive data.

Apparatus for a smart card are provided. The smart card may include an array of OLEDs. The array of OLEDs may form one or more pixels. The OLEDs may form a display of the smart card. The OLED display may be visible on a front face, back face and/or thickness of the smart card. The OLED display may have a thickness that is not greater than 0.25 mm. The OLED display may cover some or all of a surface area of a face or thickness of the smart card. For example, the surface area may be 85.60 mm×53.98 mm. The OLED display may cover 10%, 30%, 50%, 75%, 90%, 100% or any suitable percentage of the surface area.

The smart card may be any suitable size. For example, the smart card may not be greater than 86 mm×54 mm×0.8 mm. The smart card may be the size of a driver's license. A size of driver's license may be defined by the ID-1 format specified in ISO 7810. An exemplary driver's license may be 85.60×53.98 mm. The smart card may be the size of a passport booklet. An exemplary passport booklet may be 125 mm×88 mm. Passport booklets typically comply with the ID-3 format specified in ISO/IEC 7810. ISO/IEC 7810 is hereby incorporated by reference herein in its entirety. The smart card may be foldable.

An OLED display may include a substrate layer that supports the array of OLEDs. The smart card may include a circuitry layer that controls illumination of one or more pixels formed by the array of OLEDs. The smart card may include a barrier layer that keeps contaminants out of the array of OLEDs. In some embodiments, a total thickness of the substrate layer, the array of OLEDs, the circuity layer and the barrier layer may not be greater than 0.5 mm.

The smart card may include a communication circuit. The communication circuit may be configured to implement protocols for wired communication. The communication circuit may be configured to implement protocols for wireless communication. For example, the communication circuit may provide Ethernet, Wi-Fi, near field communication ("NFC"), Bluetooth or any other suitable mode of communication. Illustrative protocols for NFC are provided by the NFC Forum at www.nfc-forum.org. Wi-Fi may include passive Wi-Fi with lower power consumption than typical Wi-Fi. The communication circuit may have a thickness that is not greater than 0.8 mm.

The smart card may include a processor circuit. The processor circuit may alternatively be referred to herein as a software chip. The processor circuit may have a thickness that is not greater than 0.25 mm. The processor circuit may include a processor for controlling overall operation of the smart card and its associated components. The smart card may include RAM, ROM, an input/output ("I/O") module and a non-transitory or non-volatile memory.

The I/O module may include a microphone, button and/or touch screen which may accept user provided input. The I/O module may include one or more of a speaker for providing audio output and a display for providing textual, audiovisual and/or graphical output. The display may include one or more OLEDs.

Software may be stored within the non-transitory memory and/or other storage media. The software may provide instructions to the processor for enabling the smart card to perform various functions. For example, the non-transitory memory may store software used by the smart card, such as an operating system, application programs, web browser and a database. Alternatively, some or all of computer executable instructions of the smart card may be embodied in hardware or firmware components of the smart card.

Application programs, which may be used by the smart card, may include computer executable instructions for invoking user functionality related to communication, such as email, short message service ("SMS"), and voice input and speech recognition applications. Application programs may utilize one or more algorithms that securely store sensitive data, encrypt sensitive data, display instances of sensitive data, process received executable instructions, perform power management routines or other suitable tasks.

The smart card may include a pressure sensitive button. The pressure sensitive button may have a thickness that is not greater than 0.8 mm. The pressure sensitive button may be actuated by a user to activate the smart card. For example, actuating the pressure sensitive button may activate the processor or communication circuits.

The smart card may include a power source. The smart card's power source may include one or more batteries. A battery may be flexible. The battery may be a power source for electronic components of the smart card. For example, the battery may supply power to the OLED display, the communication circuit and the processor circuit. The battery may have a thickness that is not greater than 0.5 mm.

The smart card's power source may include high frequency signals. The smart card may be configured to utilize high frequency signals to receive information from a network node and to power other components of the smart card (e.g., recharge the battery or power the processor circuit). For example, the smart card may be configured to utilize received high frequency signals to recharge the battery or provide power to other components of the smart card. In response to receiving the power, the processor circuit may be activated and begin to draw power from a battery on the smart card. High frequency signals may be signals that have a transmission range that is less than 50 centimeters ("cm"). The communication circuit may be configured to receive and transmit signals within a range that is less than 50 cm.

The smart card may include various other components, such as a speaker and antennas. The smart card may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a processor circuit. Generally, program modules include routines, programs, objects, components, data structures, etc. that perform particular tasks or implement particular abstract data types. The smart card may be operational with a cloud computing environment where tasks are performed by remote processing devices that are linked through a communications network. In a cloud computing environment, program modules may be located in both local and remote computer storage media including memory storage devices.

The smart card may include an electrical contact. The smart card may include a plurality of electrical contacts. An electrical contact may be accessible on any suitable face of the smart card. For example, the contact may be accessible on a face of the smart card opposing an OLED display. The electrical contact may be accessible on a thickness of the smart card.

The electrical contact may allow electrical charge to be transferred to the smart card and recharge a battery of the smart card. Electrical charge may be transferred to the smart card when the smart card is inserted into a card reader. The electrical contact may allow information to be transferred to the smart card. In some embodiments, sensitive information may only be transferred to or from the smart card via the electrical contact. An electrical contact may be constructed using any suitable material that conducts or transfers electricity.

The smart card may operate in a networked environment. The smart card may support establishing network connections to one or more nodes. Such nodes may be remote computers. Nodes may be personal computers or servers that include many or all of the elements described above relative to the smart card.

The smart card may itself be a node. A node may be a sensor. A sensor may detect changes in attributes of a physical or virtual operating environment. For example sensors may measure attributes such as audio, rainfall, movement, heat/cold, water levels or activity of other sensors. Sensors may measure electronic network traffic, customer traffic, resource usage, electronic signals (e.g., input or output) or frequency of user logins within a predefined geographic area.

A node may be an actuator. For example, based on data captured by a sensor, an actuator may respond to a detected event. Based on the capture and analysis of multiple sources of data (e.g., captured by sensors), an actuator may be instructed to take action autonomously, without human intervention.

Actuators may respond to data transmitted or processed by other nodes. Actuators may include devices that modify the physical state of a physical entity. Actuators may include devices that modify a virtual state of information. Actuators may move (translate, rotate, etc.) physical objects or activate/deactivate functionalities of physical objects.

A node may be an edge-node may be a node on the periphery or edge of a network. An illustrative network may be an internet-of-things ("IoT") network. An edge-node may be positioned close to the source of generated data and have sufficient computational power to process captured data. Edge-nodes may integrate sensing capabilities, actuating capabilities, data connectivity and/or computing capacities. The smart card may be an edge-node.

Edge-nodes may control sensors, actuators, embedded devices and other nodes. Edge-nodes, or the nodes they control, may not be continuously connected to a network. Edge-nodes may provide computational resources positioned near the source of captured data or near an operating environment. Processing data using edge-nodes may reduce the communication bandwidth needed to transmit data from a node to a cloud computing environment.

Network connections may include a local area network ("LAN") and a wide area network ("WAN"), and may also include other networks. When used in a LAN networking environment, the smart card may be connected to the LAN through a network interface or adapter. The communication circuit may include the network interface or adapter. When used in a WAN networking environment, the smart card may include a modem or other means for establishing communication over a WAN, such as the Internet. The communication circuit may include the modem.

It will be appreciated that the network connections shown are illustrative and other means of establishing a communications link between devices may be used. The existence of any of various well-known protocols such as TCP/IP, Ethernet, FTP, HTTP and the like is presumed, and the smart card can be operated in a client-server configuration to permit a user to retrieve web pages from a web-based server. Web browsers can be used to display and manipulate data on web pages.

Apparatus for a smart card is provided. The smart card may have a thickness that is not greater than 0.25 mm. The smart card may have a surface area that is at least 90% of 85.60 mm×53.98 mm. The smart card may include a battery. The battery may not be greater than 0.8 mm thick.

The smart card may include a communication circuit. The communication circuit may be configured to establish a communication link between the smart card and a mobile device. Establishing the communication link may confirm that the smart card is within a predetermined distance of the mobile device. The mobile device may be paired to the smart card. The pairing may link a particular mobile device to the smart card. Pairing the mobile device to the smart card may authenticate that the user of the smart card is the user of the mobile device. The pairing may authorize a particular mobile device to issue instructions to the smart card. Establishing the communication link may confirm that the smart card has been successfully paired to the mobile device.

A pairing process may include capturing biometric credentials using a biometric reader of the smart card. The biometric credentials captured by the smart card may be verified by comparing the captured credentials to biometric data stored on the mobile device. The captured credentials may be transmitted to the mobile device using the communication link. Pairing may include capturing biometric credentials using a biometric reader of the mobile device and verifying the captured credentials using sensitive data stored on the smart card. Verifying the biometric credentials may confirm that the user is authorized to use the smart card and/or mobile device.

The pairing process may include the smart card generating and displaying a passcode. The passcode displayed by the smart card may be keyed into the mobile device to pair the devices. Any suitable pairing technique may be used.

The smart card may include a processor circuit. The processor circuit may include a non-tangible memory and a processor. The non-transitory memory may store computer executable instructions that are executable by the processor. The computer executable instructions, when executed by the processor, may establish a communication link to the mobile device. The smart card may include a communication circuit. The computer executable instructions, when executed by the processor, may establish a communication link to the mobile device using the communication circuit.

The computer executable instructions, when executed by the processor, may detect removal of the smart card from a wallet. A "wallet" as used herein may include any suitable device for holding the smart card. Wallet may include a protective case for a smartphone or a user's pocket.

The smart card may include a gyroscope. The gyroscope may include one or more microelectromechanical ("MEMS") sensors. The gyroscope may be an optical gyroscope that utilizes the Sagnac effect to detect rotation.

The gyroscope may detect rotation of the smart card. Detected rotation may indicate that the smart has been removed from the wallet. The processor may be configured to process data sensed by the gyroscope. The processor may determine whether the sensed information corresponds to the smart card being removed from a wallet.

The smart card may include a heat sensor. The heat sensor may detect when the smart card is held by a human hand. Being held by a human hand may indicate the smart card has been removed from the wallet. The processor circuit may be configured to process data captured by a heat sensor or any other suitable sensor included in the smart card. The smart card may include a gyroscope and a heat sensor.

Based on a location of the mobile device, sensitive data stored on the smart card may be activated. For example, the location of the mobile device may correspond to a known location of a wellness center. In such a known location, the mobile device may authorize activation of sensitive data corresponding to insurance card information. In such a known location, the mobile device may authorize activation of sensitive data complementary to insurance card information, such as driver's license information, date of birth information or social security information. "Complementary" information may be identifies based on machine learning algorithms. The machine learning algorithms may identify instances of sensitive data that are typically requested together.

The smart card may receive a request for sensitive data. The smart card may receive the request from a terminal within a predetermined distance of the mobile device. In some embodiments, the mobile device may be configured to receive the request. In response to the request for the sensitive data, the smart card may transmit the sensitive data to the requesting terminal. In some embodiments, the smart card may only transmit sensitive data that has been activated by the mobile device. The sensitive data may be activated after the smart card establishes a communication link with the mobile device or otherwise receives confirmation from the mobile device to active the sensitive data.

The computer executable instructions, when executed by the processor, may transmit sensitive data by generating a one-time code. The one-time code may be used for a single transaction. The one-time code may be used for a single transaction in a specific location and/or within a specific time interval. The one-time code may be generated based on sensitive data stored on the smart card. The one-time code may only be readable by a machine. The one-time code may be transmitted to the requesting terminal.

The one-time code may be formatted by the smart card to be read by the terminal. For example, the requesting terminal may be a point-of-sale terminal at a merchant location. The terminal may be configured to read credit card numbers. The one-time code may be formatted to include 16 digits, in four groups of four digits each. The one-time code may be formatted as a group of 1, 2, 5, 10, 13, 14, 15 or any suitable number of digits.

The smart card may include an electrical contact. In operation, electrical charge may be transferred from the terminal to the battery of the smart card via the contact. Electrical charge may be transferred to the smart card when the smart card is inserted into a card reader associated with the requesting terminal.

The smart card may be configured to transmit sensitive data by illuminating a face of the smart card. The face of the smart card may be illuminated in pattern for a predetermined amount of time. The pattern may present sensitive data as would be displayed on a conventional card. The pattern may not be readable by a human. For example, the pattern may be a QR code. The terminal may be configured to read the illuminated pattern. The pattern may convey the one-time code or any other suitable information needed to convey sensitive data requested by the terminal.

Sensitive data stored on the smart card may be first sensitive data. The computer executable instructions when executed by the processor of the smart card may receive an override instruction from the mobile phone. The override instruction may activate otherwise inactive second sensitive data stored on the smart card.

Based on the override instruction, the smart card may activate the second sensitive data in anticipation of receiving a request for the second sensitive data. Activating the second sensitive data before receiving the request may speed up a response time of the smart card when the request for the second sensitive data is received.

For example, sensitive data may be encrypted and stored on a designated chip. The sensitive data may need to be decrypted and extracted from the designated chip before it can be presented on the display or transmitted. Activating the sensitive data include decryption and extraction steps. Activating the sensitive data may reduce latency of the smart card when responding to requests for sensitive data. Activating the second sensitive data may include allowing the second sensitive data to be presented/transmitted when requested within a predetermined time from activation. After expiration of a predetermined time interval from activation, the sensitive information may be deactivated and will not be transmitted unless a request for sensitive data is authenticated.

In response to determining that a requesting terminal is within a predetermined distance of the mobile device, and receiving the request for the second sensitive data within a predetermined time from activation, the smart card may transmit the second sensitive data to a requesting terminal. When the smart card and the mobile device are not within a predetermined distance of each other, the smart card may not activate, transmit or display sensitive data. The excessive distance may indicate integrity of the smart card may have been compromised. For example, the smart card may not be in possession of the rightful user.

The smart card may be paired to the mobile device. The paring may require the mobile device to be within a predetermined distance of the smart card to transmit or otherwise present sensitive data. The smart card may determine whether it is within the predetermined distance of the mobile device by communicating with the mobile device. The smart card may communicate using Bluetooth communication. Some Bluetooth devices (e.g., Class 2) may have a maximum communication range of 10 meters. If the mobile device and smart card are more than 10 meters apart, they may be unable to communicate. A communication failure may indicate that the smart card is not in possession of the rightful user.

Similarly, the smart card may be unable to communicate with the mobile device over a predetermined time interval. A temporal based communication failure may indicate that the smart card may not be in possession of the rightful owner. A communication failure may indicate that the rightful user may not have initiated a request for sensitive data stored on the smart card. In some embodiments, when the smart card is unable to establish the communication link with the mobile device, the smart card may be configured to purge sensitive data stored on the smart card.

The smart card may securely store sensitive data that is expected to be accessed frequently. Frequent access may include daily or three-times each week. Frequent access may be defined based on typical usage expected for a particular user. Expected usage may be determined based on historical use of conventional cards.

As a result of frequent use, the smart card may be expected to interact with card readers that transmit electrical charge to a battery of the smart card. In some embodiments, the smart card may be configured to be stored in a protective case for a mobile device. The protective case may be configured to transfer charge from a battery of the mobile device to the smart card. The protective case may be configured to transfer charge from an auxiliary battery to the smart card. The protective case may transfer the charge while the smart card is secured or seated within the protective case.

When the smart card is not used as frequently as expected, charge stored by the battery may fall below a threshold level. A low charge level in the battery may indicate that the smart card is not in possession of the rightful user. In some embodiments, the when a processor circuit of the smart card determines that the battery has less than a threshold amount of charge, the smart card may purge sensitive data stored on the smart card.

Apparatus for a smart card is provided. The smart card may include an array of organic light emitting diodes ("OLEDs"). The array of OLEDs may form one or more pixels visible on a face of the smart card. The array of OLEDs may have a surface area that is at least 90% of 85.60 mm×53.98 mm. The smart card may include a battery that is not greater than 0.8 mm thick. The smart card may include a communication circuit. The mobile device may be paired to the smart card. The pairing may link a particular mobile device to the smart card. The pairing may authorize a particular mobile device to issue instructions to the smart card. The communication circuit may be configured to periodically establish a communication link with a mobile device.

The smart card may include a designated chipset. The designated chipset may store sensitive data. The designated chipset may encrypt the sensitive data. The sensitive data may include information associated with one or more conventional cards.

The smart card may include a processor circuit. The processor circuit may have a thickness that is not greater than 0.25 mm. In some embodiments, sensitive data may be stored in the processor circuit and/or in memory banks associated with the processor circuit.

The processor circuit may be configured to execute machine executable instructions. The instructions, when executed by the processor circuit, may configure the smart card to receive a request for sensitive data stored in the designated chip.

The processor circuit may activate sensitive data. The processor may activate sensitive data based on a location of the smart card. The processor may activate sensitive data in response to a request for the sensitive data. Activating the sensitive data may include extracting desired sensitive data from the designated chipset. Desired sensitive data may be determined based on the location of the mobile device. Desired sensitive data may be determined based on user instructions received via a paired mobile device. Desired sensitive data may be determined based on user instructions received via user interface of the smart card. The user interface may include user input received via a touchscreen. Desired sensitive data may be determined based on a device requesting the sensitive data. Activating sensitive data may include displaying the sensitive data using the array of OLEDs. Activated sensitive data may be transmitted by the communication circuit.

Sensitive data may remain encrypted even when displayed or transmitted. In some embodiments, the processor circuit may generate a one-time representation of the sensitive data for presentation or transmission. The one-time representation may only be used within a predetermined distance of the mobile device. The one-time representation may only be used within a predetermined time interval of being activated.

The one-time representation may mask sensitive data displayed or transmitted. For example, the one-time representation may be a temporary credit card number that can only be used for a single purchase. The temporary credit card number displayed or transmitted may be different from an underlying number stored on the smart card. Presenting or transmitting a temporary card number may enhance security and integrity of the sensitive data stored on the smart card. Even if a temporary card number were to be intercepted, it could not be used more than once, and possibly not at all (if the user already completed a purchase using the temporary number).

Additionally, temporary card numbers may expire after a predetermined time interval. The time interval may set so that the rightful user has sufficient time to complete a legitimate purchase, and expire prior to being used by a malicious user. Use of a temporary card number may also be restricted to a location. For example, the location of the mobile device may be a known wellness center or pharmacy. In such a location, insurance card information stored on the smart card may be extracted and presented. In other locations, an override instruction must be provided to activate the insurance card information. A location restriction may further reduce a possibility security and integrity of the sensitive data stored on the smart card may be compromised.

The smart card may be configured to present sensitive data on a face of the smart card. The face of the smart card may include an array of OLEDs. The processor circuit may control illumination of pixels formed by the array. The processor circuit may configure the pixels to illuminate in manner that conveys sensitive data. The pixels may be illuminated in a manner that conveys the sensitive data in human or machine readable form.

Sensitive data presented by the smart card may be usable to initiate a purchase transaction with a merchant point-of-sale terminal. For example, the sensitive data presented by the smart card may include information typically included on a conventional credit or debit cards. Such information may include a card number, expiration date, card verification value, name on the card, address associated with the card or any other suitable information.

In some embodiments, the sensitive information presented by the smart card may be formatted as a driver's license. The OLED display may present driver's license sensitive data formatted as a tangible driver's license. The smart card may determine an appropriate format of the sensitive data based on an address associated with the driver's license. For example, different states or countries may format driver's license information differently. The smart card may determine a format of sensitive data based on an address associated with the sensitive data. The smart card may determine a format of sensitive data based on a current location of the smart card or location of a requesting terminal.

In some embodiments, sensitive information presented by the smart card may be formatted as a passport. A format of passport information may be determined based on an address associated with the passport. A format of passport information may be determined based on a current location of the smart card. Based on a state or country, the smart card may present sensitive data along with security features, such as holographs, associated with a tangible driver's license, passport or other conventional card. The OLED display may present an electronic replication of the security features.

The processor circuit of the smart card may impose limits on the sensitive data presented by the smart card. Limits may be imposed based on a geographic location of a paired mobile device. The smart card may be configured to accept an override request to adjust the limits. Override requests and limit adjustments may be provided via a paired mobile device linked to the smart card.

Methods for securing sensitive data are provided. The methods may include storing sensitive data on a designated chipset embedded on a smart card. Storing the sensitive data on the designated chipset may secure the sensitive data from exposure if the smart card is lost or stolen. The designated chipset may be configured to only allow access to the sensitive data stored thereon when the smart card is able to communicate with a paired mobile device.

Methods may include maintaining storage of the sensitive data on the designated chipset as long as the smart card remains paired to a mobile device. When the smart card is unable to connect or otherwise communicate with the paired mobile device, the designated chipset may be configured to purge sensitive data stored thereon. The sensitive data may be purged if the smart card in unable to connect with the paired mobile device for a predetermined time interval.

The designated chipset may encrypt sensitive data. The designated chipset may only allow the smart card to present sensitive data in encrypted form. The designated chipset may be configured to purge sensitive data in response to detecting an attempt to physically extract the designated chipset from the smart card. The designated chipset may be configured to purge the sensitive data in response to detecting an attempt to tamper (physically or electronically) with the designated chipset. The designated chipset may be configured to purge sensitive data in response to detecting an attempt to access the sensitive data using any method other than by execution of computer executable instructions stored on the smart card.

The smart card may receive a request for sensitive data. In some embodiments, a mobile device may receive the request. The mobile device may be paired to the smart card. The mobile device may request authorization for a user to instruct the smart card to present/transmit the requested sensitive data. Methods may include receiving, at the smart card, confirmation from the mobile device that a request for sensitive data has been authorized.

The mobile device may be an edge-node. The mobile device may be configured to perform one or more verification routines to ascertain whether to authorize the smart card to respond to the request and present sensitive data. The mobile device may confirm the requesting and verifying a biometric credential or other passcode. The mobile device may be configured to communicate with a cloud computing environment to ascertain whether the request is authorized. The cloud computing environment may be configured to determine whether the terminal requesting sensitive data is a trusted device or terminal.

Methods may include determining whether a requesting terminal or other device is trusted. Trust may be determined by the mobile device, cloud computing environment smart card or any suitable combination thereof. Trust may be determined based on a threshold number of authorized requests for sensitive data received from a requesting terminal/device, a location of the requesting terminal, an operator (e.g., a known merchant or service provider) of the requesting terminal or any other suitable criteria.

A mobile device may be configured to request that a smart card user provide a biometric credential to confirm that disclosure of the requested sensitive data is authorized. The mobile device may confirm that provided biometric credentials match those associated with the user or the requested sensitive data.

A mobile device may be configured to control presenting requested sensitive data. For example, the mobile device may determine that a one-time code should be generated based on the sensitive data. The mobile device may provide a nonce or seed value for generating the one-time code. In some embodiments, the mobile device may instruct the smart card to generate a one-time public representation of the sensitive data.

A one-time public representation may be formatted as other users or machines expect a particular instance of sensitive data to be formatted on a conventional card. For example, the one-time public representation may be formatted as a valid credit card number or driver's license identification number. However, the one-time public representation may be different from the underlying sensitive data.

The one-time representation may be usable only once. For example, in response to a single request for the sensitive data. The one-time representation may be usable for a limited time. The one-time representation may be usable within a limited geographic area. Generating the one-time public representation may include illuminating pixels within an array of OLEDs on the smart card.

Methods may include generating an authorization code on a mobile device. A one-time public representation of the sensitive data may not usable without the authorization code. For example, the request for sensitive data may be received from a POS system at a merchant location. To complete a purchase transaction at the POS system, an authorization code generated by the mobile device and the one-time presentation presented by the smart card must both be transmitted to the POS system.

In some embodiments, the smart card itself may have sufficient processing power to confirm that disclosure of requested sensitive data is authorized and determine a format for presenting the sensitive data. In such embodiments, the smart card may be configured to determine whether the device or requesting terminal is trusted or authorize a request.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with another illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative system architecture 100. Architecture 100 may represent an illustrative network. Architecture 100 may include one or more nodes. Each node may include two or more nodes. Nodes may be linked to each via network 105. FIG. 1 shows exemplary nodes 103 that include sensors and actuators. Nodes 103 may communicate with data analysis engine 109 and data depository 101. Data analysis engine 109 and data depository 101 may be provided by a cloud computing environment.

Sensors may include devices that detect changes in a physical or virtual environment. Sensors may measure changes in their native (physical or virtual) environment, capture data corresponding to the measured changes and store/communicate the captured data. Sensors may be accessed by other sensors or other network nodes. Sensors may transmit captured data to another node.

Actuators may respond to data transmitted or processed by other nodes, such as data analysis engine 109. Actuators may include devices that modify the physical state of a physical entity. Actuators may include devices that modify a virtual state of information. Actuators may move (translate, rotate, etc.) physical objects or activate/deactivate functionalities of physical objects. For example, actuators may control illumination of an OLED display, activate sensitive data, purge sensitive data, dim a light bulb, open a door, change a climate control setting, move objects and/or any other suitable functionality. A single node may include the functions of sensors and actuators.

Generally, nodes on network 105 may interact and cooperate using one or more interaction paradigms. Exemplary interaction paradigms include principal-agent, client-server and peer-to-peer interactions. As a result of the disparate nature of nodes 103, system architectures, such as architecture 100 incorporating nodes 103 may support a variety of communication protocols.

Nodes 103 may be produced by different manufacturers. Nodes 103 may capture data in different formats. For example, nodes 103 may use different data structures to store captured data. Nodes 103 may utilize different communication protocols to transmit captured data or communicate with other nodes. Despite such operational differences, nodes 103 may be configured to operate substantially seamlessly together.

Nodes 103 may belong to, or be operated by, different administrative/management domains. Nodes 103 may be operated by different domains without expressly-defined relationships among such domains. Interoperability of nodes 103 may allow captured data to be substantially seamlessly captured and interpreted by data analysis engine 109 (or other nodes). Based on interpreting the captured data, data analysis engine 109 may issue instructions to nodes 103.

Data capture by one or more of nodes 103 may be controlled by one or more other nodes. For example, data analysis engine 109 may control a quantity and/or quantity of data captured by nodes 103. Alternatively, data depository 101 and/or analysis engine 109 may filter or otherwise intelligently process data captured by nodes 103. One of nodes 103 may control data capturing or actuation of another of nodes 103.

Timing of when data is captured by nodes 103 may be controlled by any suitable node of architecture 100. For example, data may be captured in real-time or at pre-defined intervals such as once a day. Data may also be captured in response to a detected environmental status change.

Data analysis engine 109 may filter data captured by nodes 103. Data analysis engine 109 may repackage or reformat captured data. Data conversion may include encapsulating or applying a normalized communication protocol. Data conversion may include transformation of low level raw data (possibly from multiple sensors or groups of sensors) into meaningful information for a specific audience or for a specific analysis.

Data analysis engine 109 may perform pattern recognition to identify correlations and trends in captured data (e.g., data stored in depository 101). Such trends may identify complementary instances of sensitive data. Data depository 101 may receive data captured by nodes 103. In some embodiments, data captured by nodes 103 may be transmitted directly to data analysis engine 109. Data stored in depository 101 may be sorted and analyzed by data analysis engine 109.

Data stored in data depository 101 may be so voluminous and complex (e.g., structured/unstructured and/or constantly changing) that traditional data processing application software may be inadequate to meaningfully process the data (e.g., "big data"). Data analysis engine 109 may include software applications specially designed to process large volumes of data ("big data analytics"). Data analysis engine 109 may optimize processes, reduce loss (e.g., fraud, breach of confidentiality) improve efficiency and identify new analytical models that may utilize data captured by nodes 103.

Architecture 100 may include one or more layers of software applications. Software applications may implement a variety of functions and provide varied services to nodes of architecture 100. Software applications running on data analysis engine 109 may submit requests to nodes 103 for retrieval of specific data to achieve a functional goal. Software applications may control data captured by nodes 103 or actions taken by nodes 103. Software applications may provide security services that mitigate threats to the integrity of data transmitted by sensors 103 or architecture 100 generally.

Nodes 103 that are positioned relatively close to a source of data and having sufficient computational power to process data may be termed "edge-nodes." Edge-nodes may integrate sensing capabilities, actuating capabilities, data connectivity and/or computing capacities. Edge-nodes may control sensors, actuators, embedded devices and other nodes. Edge-nodes, or the nodes they control, may not be continuously connected to network 105. Edge-nodes may provide increased computational resources positioned near the source of captured data. Processing data using edge-nodes may reduce communication bandwidth needed to transmit data from a node to a cloud computing environment for processing. A smart card may be an edge-node. A smart card may receive instructions from an edge-node.

Nodes 103 may be grouped. Nodes may be grouped based on physical proximity or based on proximity to an edge-node. An edge-node may create and/or be included in a node group. In some embodiments, captured data may be organized by an edge-node. An edge-node may manage and coordinate inter-node communications for members of a group.

Figure 2:
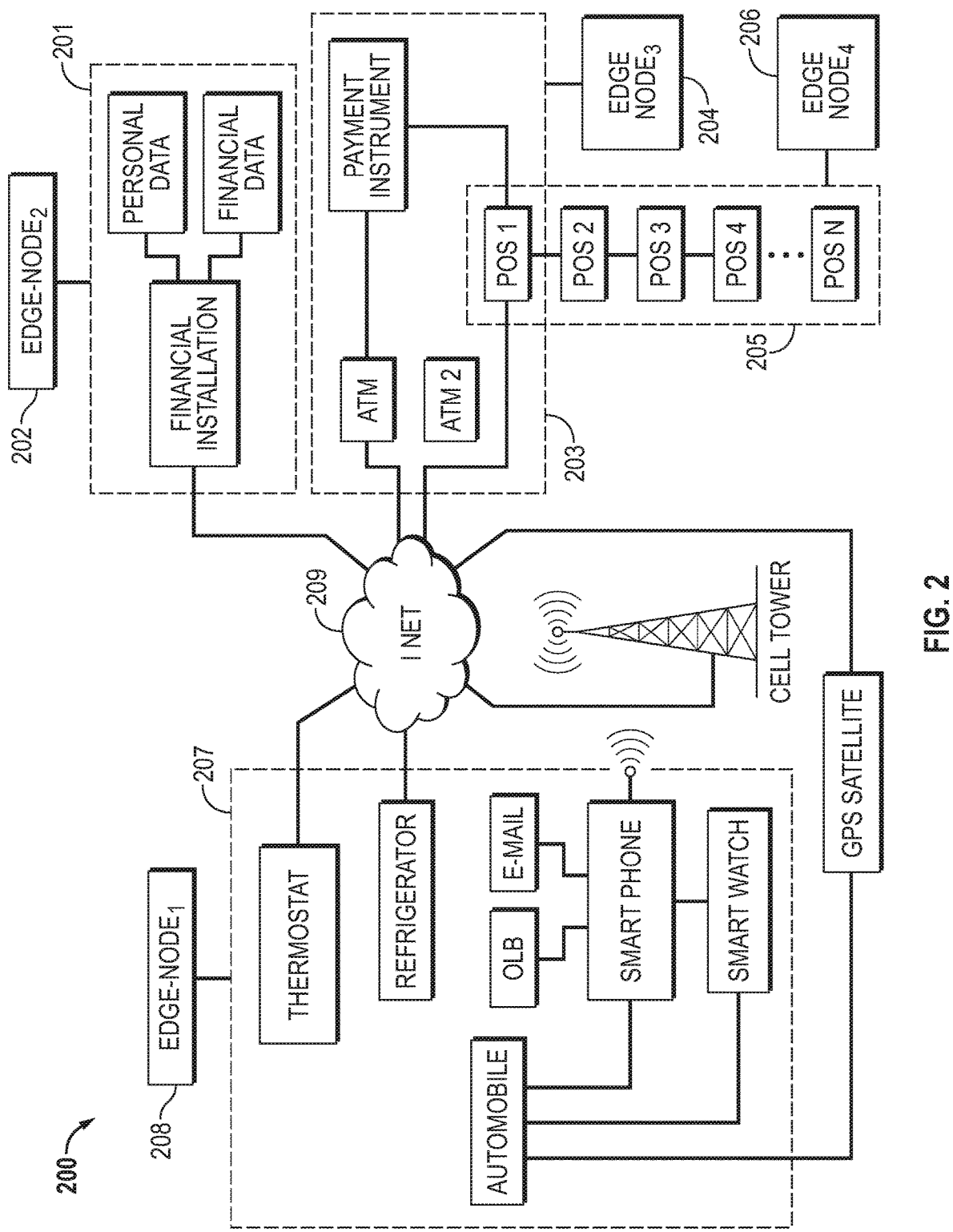
FIG. 2 shows an illustrative system in accordance with principles of the disclosure.

FIG. 2 shows illustrative node groups 200. Edge-node 208 is associated with group 207. Edge-node 208 may facilitate seamless communication among nodes of group 207. Edge-node 208 may facilitate secure communication among nodes of group 207. Edge-node 208 may process data gathered by nodes in group 207. Edge-node 208 may be a smart card that controls release of sensitive data to nodes in group 207.

Edge-node 202 is associated with group 201. Edge-node 202 may facilitate seamless communication among nodes of group 201. Edge-node 202 may facilitate secure communication among nodes of group 201. Edge-node 202 may process data gathered by nodes in group 201. Edge-node 202 may be a smart card that controls release of sensitive data to nodes in group 201.

Edge-node 204 is associated with group 203. Edge-node 204 may facilitate seamless communication among nodes of group 203. Edge-node 204 may facilitate secure communication among nodes of group 203. Edge-node 204 may process data gathered by nodes in group 203. Edge-node 204 may be a smart card that controls release of sensitive data to nodes in group 203.

Edge-node 206 is associated with group 205. Edge-node 206 may facilitate seamless communication among nodes of group 205. Edge-node 206 may facilitate secure communication among nodes of group 205. Edge-node 206 may process data gathered by nodes in group 205. Edge-node 206 may be a smart card that controls release of sensitive data to nodes in group 205.

Data gathered by nodes in group 207 may be used by nodes in groups 207, 205 or 201. For example, data gathered by nodes in group 207 may indicate instances of sensitive data that are relevant to nodes group 207. Relevant sensitive data may be determined based on a current location of a customer, a location of a node, function of a node or any other suitable characteristic that may indicate a particular instance of sensitive data is relevant to a node. Edge-node 208 may limit activation/presentation/transmission of non-relevant sensitive data. Limitations may include requiring one or more authorizations or other confirmation before activating non-relevant sensitive data requested by nodes in group 207. Such data may be used by sensors in groups 201, 203 or 205 to activate an instance of sensitive data stored on a smart card.

FIG. 2 shows nodes groups communicating via central network 209. Edge-nodes may facilitate direct communication between one or more nodes of its group and one or more nodes of another group.

Nodes may be grouped based on "closeness." "Closeness" may be defined based on geographic proximity. "Closeness" may be defined based on a length of a communication pathway (physical or virtual) that connects a node and an edge-node. "Closeness" may be defined based on a length of a communication pathway (physical or virtual) that connects a node and an edge-node. A length of a communication pathway may be defined based on a number of intermediary nodes between a node and an edge-node. A length of a communication pathway may be defined based on distance physically separating a node from an edge-node. Closeness may include related functionality. For example, nodes part of a POS system may be functionally related. Nodes in a known location may be related to a function (e.g., financial or wellness services) provided in the known location.

Figure 3:
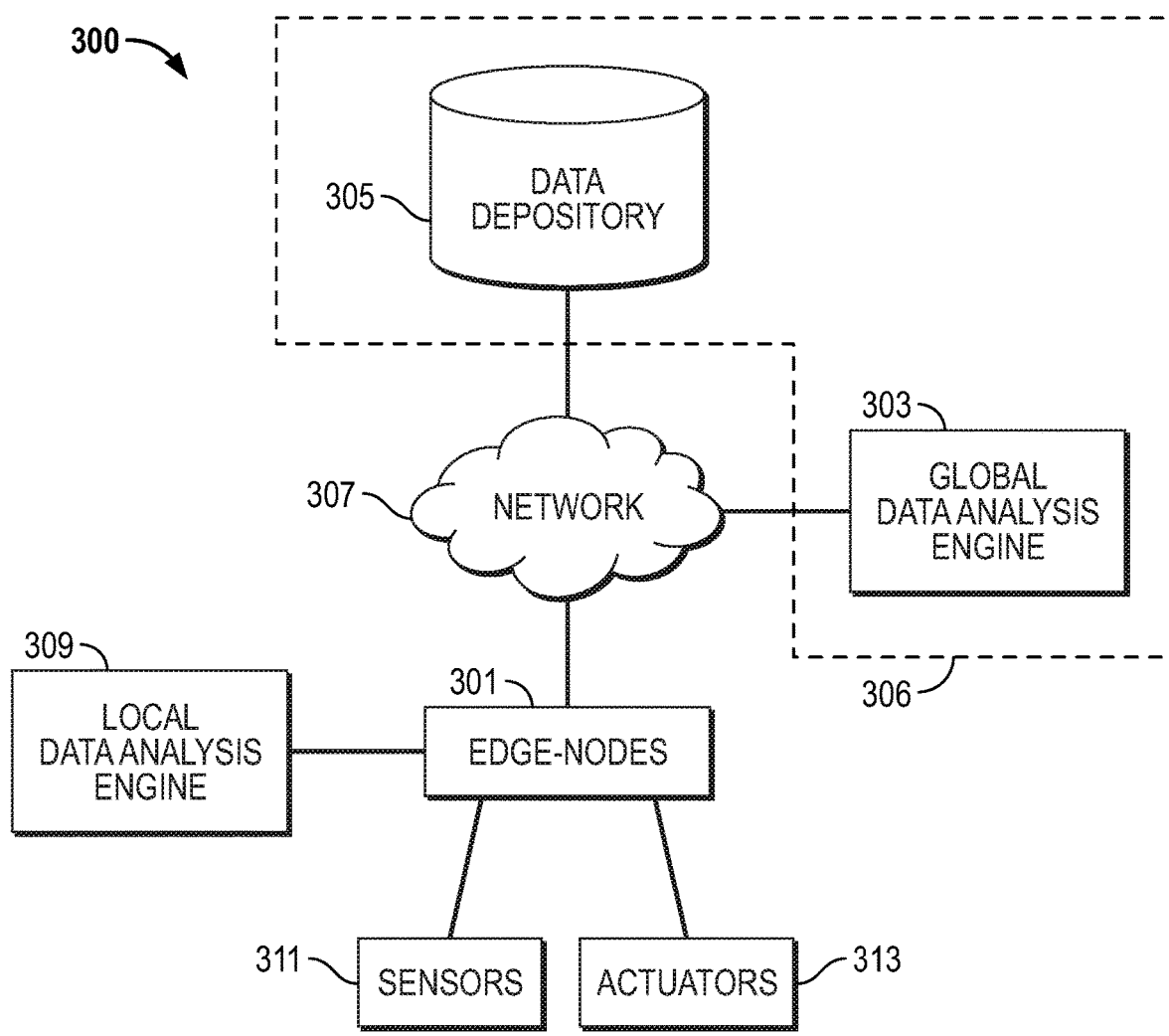
FIG. 3 shows an illustrative system in accordance with principles of the disclosure.

FIG. 3 shows illustrative system architecture 300. System 300 includes data depository 305 and global data analysis engine 303. Data depository 305 and global data analysis engine 303 may be provided by cloud computing environment 306. Data depository 305 may store data captured by sensors 311 and generated by actuators 313. Global data analysis engine 303 may be configured to trigger, based on the captured data, one or more verification routines before authorizing a smart card to present sensitive data. Global data analysis engine 303 may communicate directly with a smart card using its communication circuit. Global data analysis engine 303 may communicate with a smart card via a mobile device paired to the smart card.

System 300 includes edge-node(s) 301. Edges-node(s) 301 may be configured to receive data from sensors 311 and issue instructions to actuators 313. Edges-node(s) 301 may include a smart card and/or a mobile device paired to the smart card. Edge-node(s) 301 may be configured to track presentation/transmission of sensitive data by a smart card. Edge-node(s) 301 may be configured to track a location of a smart card. Sensors 311 may capture authentication credentials of a customer prior to presenting sensitive data. Edge-node(s) 301 may control a format of sensitive data presented by a smart card.

Based on data captured by sensors 311, edge-node(s) 301 may process the data gathered using local data analysis engine 309. Edge-node(s) 301 may issue instructions to actuators 313. The instructions may illuminate an OLED display or transmit sensitive data. The instructions may push or purge sensitive data from data depository 305 to edge-node(s) 301 via network 307.

Figure 4:
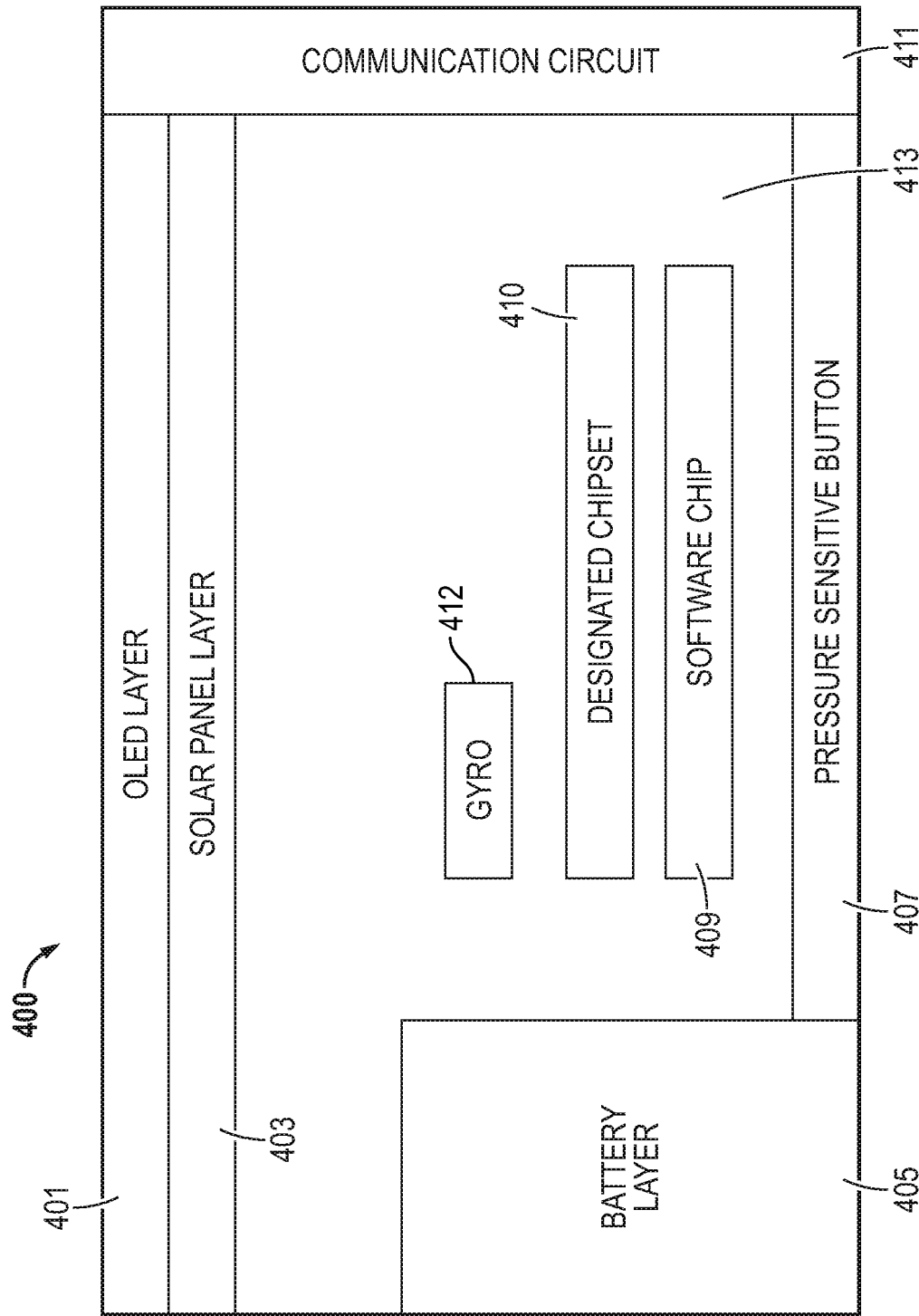
FIG. 4 shows illustrative apparatus in accordance with principles of the disclosure.

FIG. 4 shows an illustrative view of thickness 413 of smart card 400. Smart card 400 includes OLED layer 401. OLED layer 401 may form a bendable/rollable, relatively thin OLED display with relatively lower power consumption than other display technology.

Smart card 400 may include a touch sensor (not shown). The touch sensor may be not greater than 0.001 mm thick. In some embodiments, the touch sensor may be embedded within OLED layer 401. Integrating the touch sensor into the OLED layer 401 may reduce reflectivity due to any space between the touch sensor and OLED layer 401. Reducing reflectivity may increase visibility of information presented using OLED layer 401. A touch sensor may detect heat from a human hand. A touch sensor may be a capacitive touch sensor. A touch sensor may detect when smart card 400 is being held by a human hand. A touch sensor may detect when smart card 400 is removed from a wallet or other holder.

Using OLED layer 401 to display information may provide several technical advantages. OLED displays may provide lower power consumption, wider viewing angles, better colors, higher contrast, operate in a wider heat/cold ranges and enable faster refresh rates than other display technology. In some embodiments, OLED displays may be fabricated directly on control circuitry. OLED displays may only include trace amounts of heavy metals. Thus, when disposed of, OLED display may be less harmful to the environment than other display technology.

Smart card 400 includes solar panel layer 403. OLED displays may be transparent when not illuminated. Thus when OLED layer 401 is not illuminated, OLED layer 401 may be transparent. Sunlight may pass through OLED layer 401 and reach solar panel layer 403. Solar panel layer 403 may convert solar energy into electricity that powers one or more components of smart card 400. Solar panel layer 403 may be thin enough to be flexible.

Smart card 400 includes battery 405. Battery 405 may be rechargeable. Battery 405 may be flexible. Battery 405 may be recharged by power generated by solar panel layer 403. Battery 405 may be rechargeable from a power source external to smart card 400.

Smart card 400 includes software chip 409. Software chip 409 may control overall operation of smart card 400 and its associated components. Software chip 409 may include a processor circuit for executing machine readable instructions. Software chip 409 may include a non-transitory memory. Smart card 400 may include non-transitory memory locations (not shown) within thickness 413. Software chip 409 may access such memory locations. The non-transitory memory locations may store instructions, that when executed by software chip 409, cause smart card 400 to perform various functions.

For example, memory locations may store software used by smart card 400, such as an operating system, application programs and an associated database.

Smart card 400 includes communication circuit 411. Communication circuit 411 may be a communication chip or chipset. Communication circuit 411 may provide smart card 400 with wireless or wired communication functionality. Communication circuit 411 may enable smart card 400 to communicate using a variety of communication protocols including, Wi-Fi, Bluetooth, Ethernet, NFC and cellular telecommunications.

Smart card 400 includes pressure sensitive button 407. Pressure sensitive button 407 may be mechanically actuated. Actuation of pressure sensitive button 407 may provide an electronic signal to software chip 409 or any other component of smart card 400. The electronic signal may trigger further action by software chip 409 or any other component of smart card 400.

For example, mechanical actuation of pressure sensitive button 407 may power-on and/or power-off software chip 409. Mechanical actuation of pressure sensitive button 407 may inform software chip 409 of a user's selection of choices displayed using OLED layer 401.

Smart card 400 also includes gyroscope ("gyro") 412. Gyro 412 may include one or more MEMS sensors. Gyro 412 may be an optical device that utilizes the Sagnac effect to detect rotation of smart card 400. Software chip 409 may be configured to process data sensed by gyro 412. Based on information captured by gyro 412, software chip 409 may determine an orientation of smart card 400. Software chip 409 may determine whether information sensed by gyro 412 indicates smart card 400 has been removed from a wallet or moved from a stable position.

Smart card 400 includes designated chipset 410. Designated chipset 410 may provide NFC functionality. Designated chipset 410 may store sensitive data. For example, designated chipset 410 may store passport information, account numbers, credit/debit card number and driver's license information. Sensitive data stored on designated chipset 410 may encrypted before being stored on designated chipset 410. Designated chipset 410 may be isolated from an operating system or other applications executed by software chip 409 or communication circuit 411.

FIG. 4 shows illustrative components 401-412 of smart card 400 in an arrangement within an illustrative thickness 413 of smart card 400. The arrangement shown in FIG. 4 is illustrative. Smart card 400 may include additional components not shown in FIG. 4, such as a biometric sensor. One or more of components 401-412, and any additional components, may be arranged within smart card 400 in any suitable fashion. For example, pressure sensitive button may be located in space 413. OLED layer 401 and/or solar panel layer 403 may flex or bend to allow a user to mechanically actuate pressure sensitive button 407.

Some embodiments may not include all of components 401-412. For example, a smart card may not include solar panel layer 403 or pressure sensitive button 407.

Figure 5:
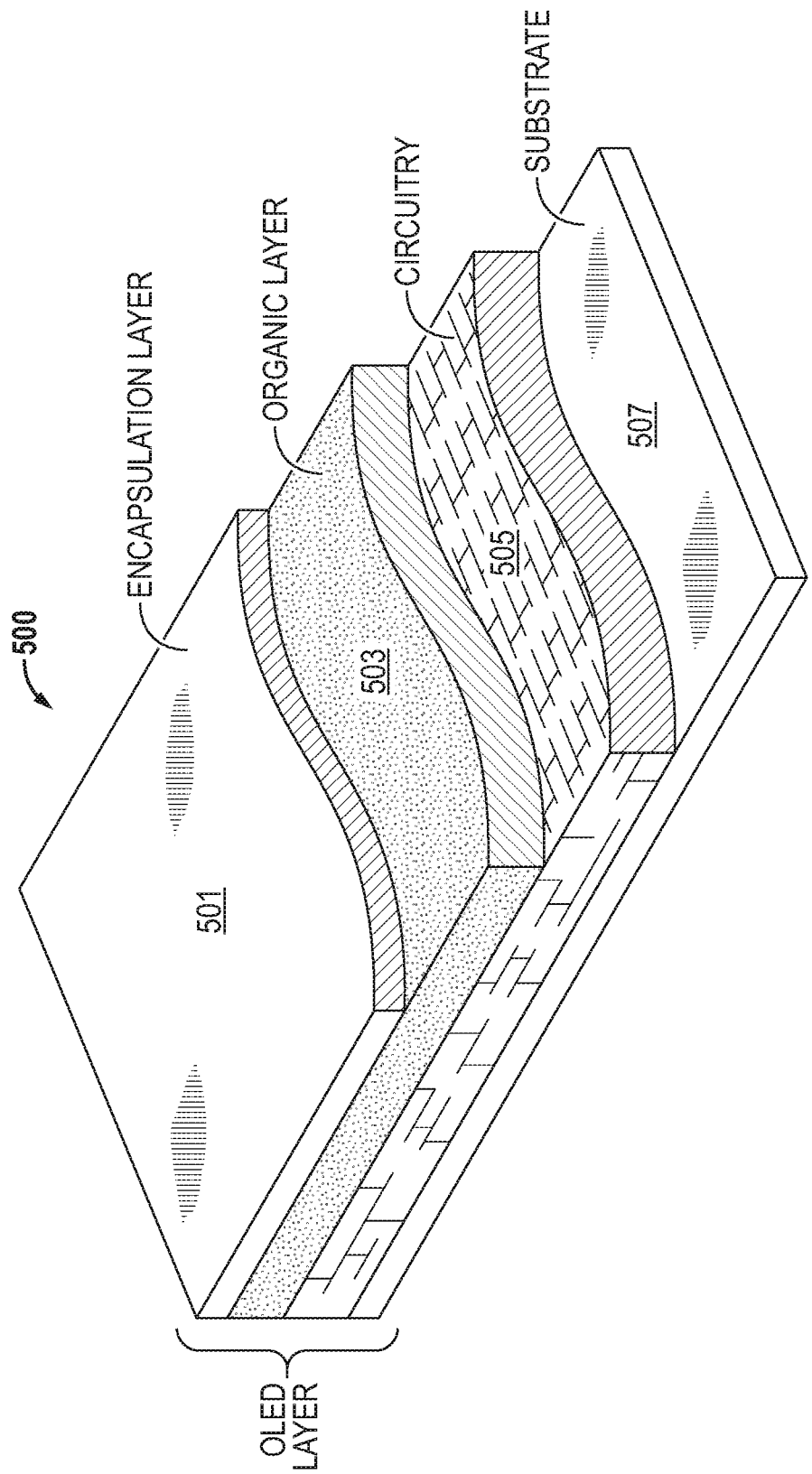
FIG. 5 shows illustrative apparatus in accordance with principles of the disclosure.

FIG. 5 shows structures 500 of an illustrative OLED layer, such as OLED layer 401 (shown in FIG. 4). Structures 500 include four layers: encapsulation layer 501, organic layer 503, circuitry layer 505 and substrate layer 507.

Encapsulation layer 501 protects the OLED layer from exposure to oxygen, water and other contaminants. Preferably, encapsulation layer 501 is flexible and transparent. Glass is an exemplary material that may be used to construct encapsulation layer 501. When glass is used to construct encapsulation layer 501, the glass may be very thin and flexible. For example, the glass may be between 50 micrometers ("μm") and 100 μm thick.

In some embodiments, encapsulation layer 501 may be constructed using thin-film encapsulation techniques such as Atomic Layer Deposition ("ALD"). ALD is a process that utilizes chemicals that, when deposited on a material, react to create a solid, thin film.

Structures 500 include organic layer 503. Organic layer 503 typically includes an emissive solid-state semiconductor. Organic layer 503 may be constructed from a thin film of organic (carbon-based) material. For example, organic layer 203 may include one or more OLEDs. When electricity is applied to an OLED within organic layer 503, electrons flow through organic layer 503 and release photons, thereby emitting light. Different types of emissive materials may be used. Each type of material may be associated with a different color light. An intensity of light emitted by organic layer 503 may be controlled by the amount of electricity flowing through organic layer 503.

Organic layer 503 may be doped with "host" materials. Host material may affect a property, such as power efficiency, of organic layer 503. For example, organic layer 503 may be doped with materials that improve its operation and/or achieve a desired color.

Organic layer 503 may include two or more sub-layers (not shown). For example, organic layer 503 may include 5, 10 or 15 sublayers. Illustrative sub-layers may include: (1) an electron transport layer, (2) a blocking layer, (3) an emissive layer, (4) a hole transport layer and (5) an injection layer.

For example, an emissive layer may be placed between a cathode and an anode. When electricity is applied, electrons flow from the cathode to the anode. OLED displays may be driven by electrical current or voltage. In a preferred embodiment, the OLED display is driven by current. The cathode inserts electrons into the emissive layer, and the anode removes the electrons. Electron "flow" through the emissive layer releases photons, generating light. The color of the generated light may be changed by including different types of materials within the emissive layer.

A direction of light emitted by organic layer 503 may be controlled by a degree of transparency of the anode and/or cathode. In some embodiments, a cathode may be reflective. Such a cathode may preferably be constructing using an aluminum based-compound or lithium fluoride. An anode may be transparent. A transparent anode may preferably be constructed using indium tin oxide. In such embodiments, when current flows between the cathode and anode, light is emitted through circuitry layer 505 and substrate layer 507. Circuitry layer 505 and substrate layer 507 may be transparent. Such embodiments may be referred to as "bottom-emitting OLEDs."

In some embodiments, the cathode may be transparent. Such a cathode may preferably be constructed using indium tin oxide. The anode may be reflective. The reflective anode may direct light toward the transparent cathode. Such embodiments may be referred to as "top-emitting OLEDs." Typically, top-emitting designs are more efficient and are used to construct higher resolution OLED displays.

Additionally, top-emitting designs may allow organic layer 503 to be formed on a non-transparent substrate. Small-and medium-sized OLED displays (e.g., 1-7 inches) are typically constructed using top-emitting techniques.

Organic layer 503 may include one or more pixels. Different architectures are available for forming pixels using OLEDs. One exemplary architecture includes positioning different color (e.g., red, green and blue) OLEDs adjacent to each other. Another exemplary architecture includes stacking different color OLEDs on top of each other. OLEDs may be stacked because materials used to construct organic layer 503 may be transparent. A stacked design may provide a smaller pixel size and higher resolution.

Structures 500 include circuitry layer 505. Circuitry layer 505 includes electronics that drive one or more pixels formed within organic layer 503. Preferably, amorphous silicon ("a-Si") and low temperature polysilicon ("LTPS") may be used to construct circuitry layer 505. In some embodiments, circuitry layer 505 may be transparent.

Substrate layer 507 supports circuitry layer 505, organic layer 503 and encapsulation layer 501. Substrate layer 501 may be constructed using various materials. For example, substrate layer 507 may be constructed using glass, plastic or metal materials. In some embodiments, such as in bottom-emitting OLEDs, substrate layer 507 may function as encapsulation layer 501.

Figure 6:
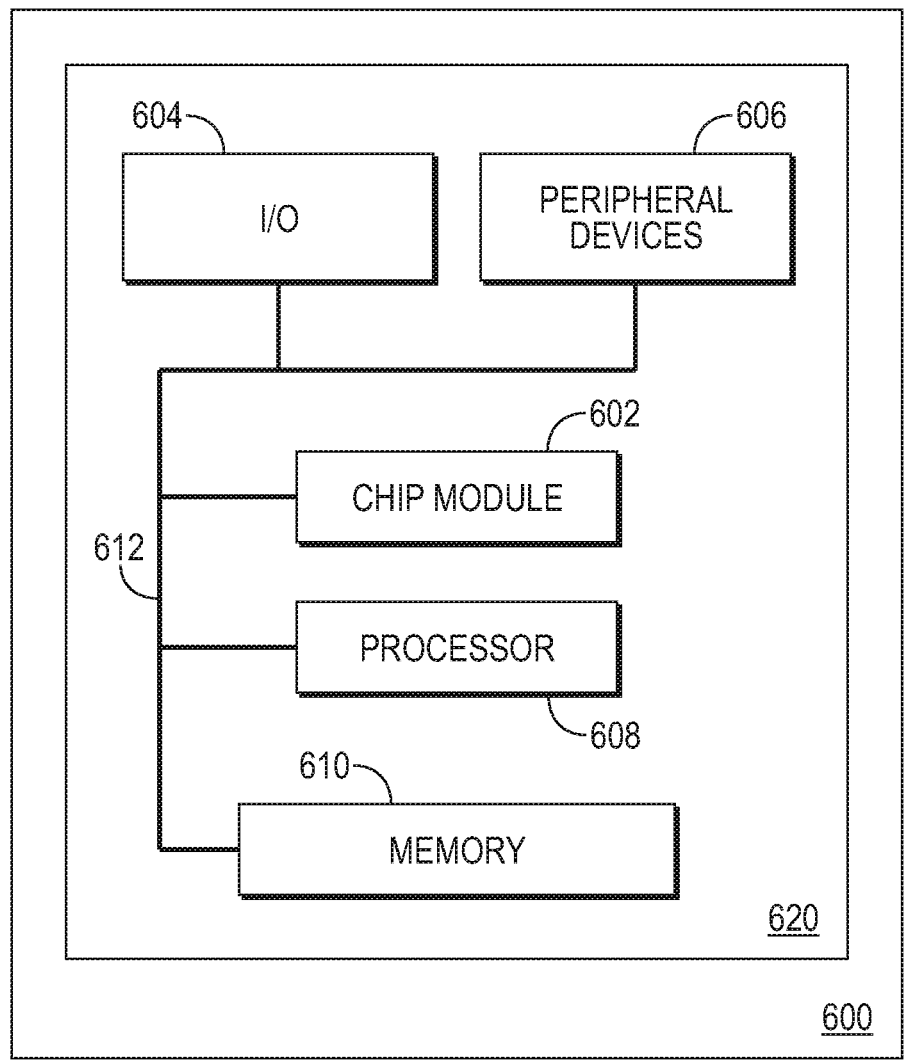
FIG. 6 shows illustrative apparatus in accordance with principles of the disclosure.

FIG. 6 shows illustrative software chip 600. Software chip 409 may include one or more features of software chip 600. Software chip 600 includes chip module 602, which may include one or more integrated circuits, and which may include logic configured to perform any suitable logical operation.

Software chip 600 may include one or more of the following components: I/O circuitry 304, which may include a transmitter device and a receiver device and may interface with fiber optic cable, coaxial cable, telephone lines, wireless devices, physical layer hardware, a keypad/display control device or any other suitable encoded media or devices; peripheral devices 306, which may include counter timers, real-time timers, power-on reset generators or any other suitable peripheral devices; logical processing device 608, which may compute data structural information, structural parameters of the data, quantify indices; and machine-readable memory 610.

Machine-readable memory 610 may be configured to store sensitive data in machine-readable data structures. Components 602, 604, 606, 608 and 610 may be coupled together by a system bus or other interconnections 612 and may be present on one or more circuit boards such as circuit board 620. In some embodiments, the components may be integrated into a single chip. The chip may be silicon-based.

Figure 7:
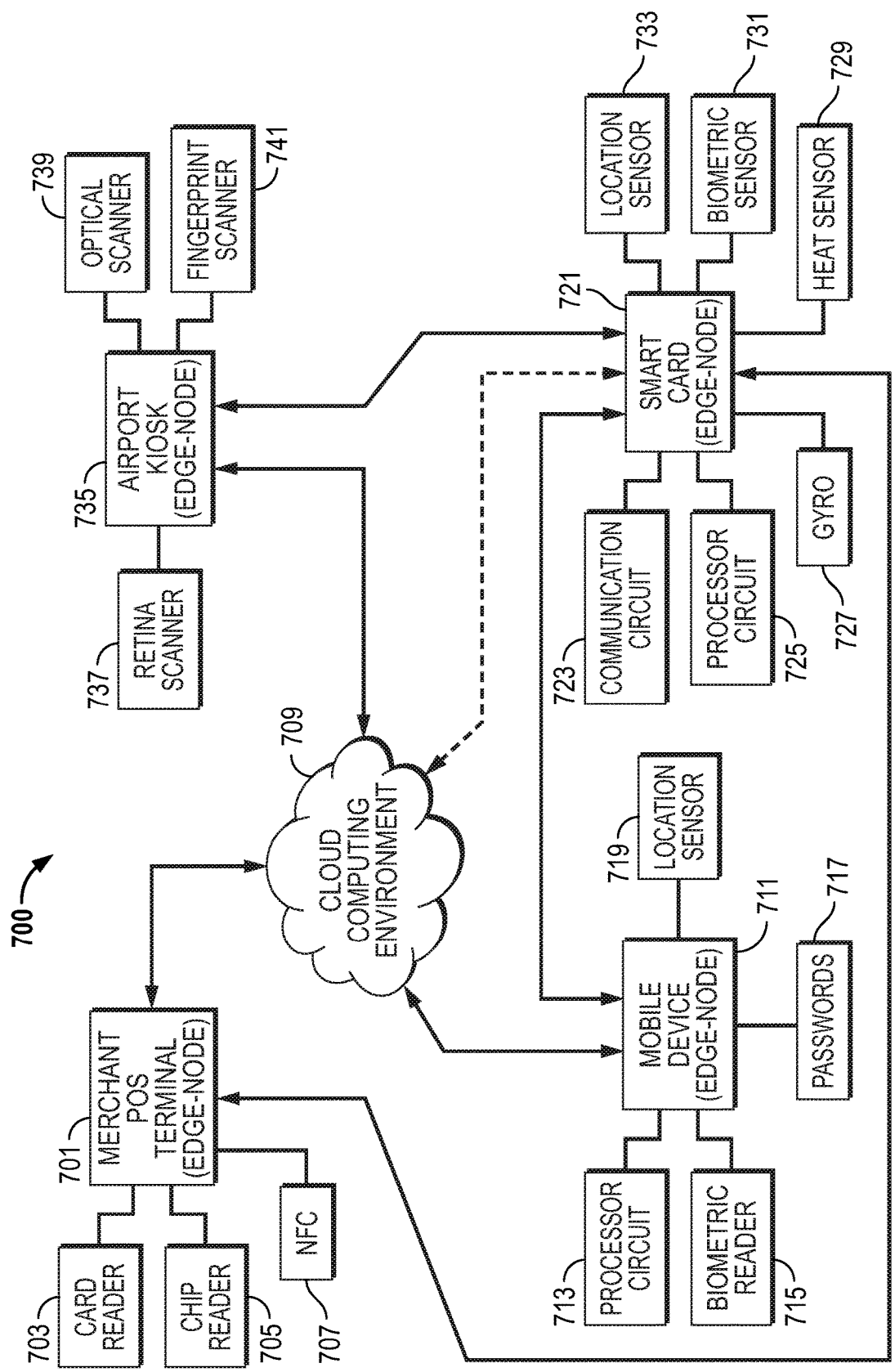
FIG. 7 shows an illustrative system in accordance with principles of the disclosure.

FIG. 7 shows illustrative system 700. System 700 includes merchant POS terminal 701. Merchant POS terminal 701 may be an edge-node. Merchant POS terminal 701 includes sensors/actuators card reader 703, chip reader 705 and NFC chip 707. Merchant POS terminal 701 may use card reader 703, chip reader 705 or NFC chip 707 to communicate with smart card 721. Merchant POS terminal 701 may request sensitive data stored on smart card 721.

System 700 includes airport kiosk 735. Airport kiosk 735 may be an edge-node. Airport kiosk 735 includes sensors/actuators such as retina scanner 737, fingerprint scanner 741 and optical scanner 739. Optical scanner 739 may be used to capture sensitive data presented by smart card 721.

Smart card 721 may be an edge-node. Smart card 721 includes processor circuit 725 and communication circuit 723. Smart card 721 includes sensors such as gyro 727, heat sensor 729, biometric sensor 731 and location sensor 733.

Smart card 721 may have a sleep mode in which components are powered off until needed. For example, when in the sleep mode, communication circuit 723 may be deactivated and unable to receive or transmit data. Gyro 727 may detect movement of smart card 721. Movement detected by gyro 727 may bring smart card 721 out of the sleep mode.

Using communication circuit 723, smart card 721 may receive a request for sensitive data from merchant POS terminal 701 or airport kiosk 735. Processor circuit 725 may activate sensitive data responsive to the request. Activating sensitive data may include generating a one-time code or one-time public representation of sensitive data. Before transmitting sensitive data, processor circuit 725 may use communication circuit 735 to determine whether a connection is available to mobile device 711.

Mobile device 711 may be paired to smart card 721. Smart card 721 may not transmit sensitive data unless a connection is established with mobile device 711. Mobile device 711 may issue a prompt for authentication before allowing smart card 721 to transmit sensitive data to merchant POS terminal 701 or airport kiosk 735. Mobile device 711 may prompt for passwords 717, a biometric credential using biometric reader 715 or confirm a location using location sensor 719.

Smart card 721 may transmit activated sensitive data using communication circuit 723. Smart card 721 may itself prompt a user for biometric credentials using biometric sensor 731 or confirm a location using location sensor 733 before transmitting sensitive data.

System 700 also includes cloud computing environment 709. Cloud computing environment 709 may monitor and track requests for sensitive data submitted by merchant POS terminal 701 or airport kiosk 735. Cloud computing environment 709 may monitor and track sensitive data provided by smart card 721. In some embodiments, cloud computing environment 709 may issue instructions that purge sensitive data stored on smart card 721.

Figure 8:
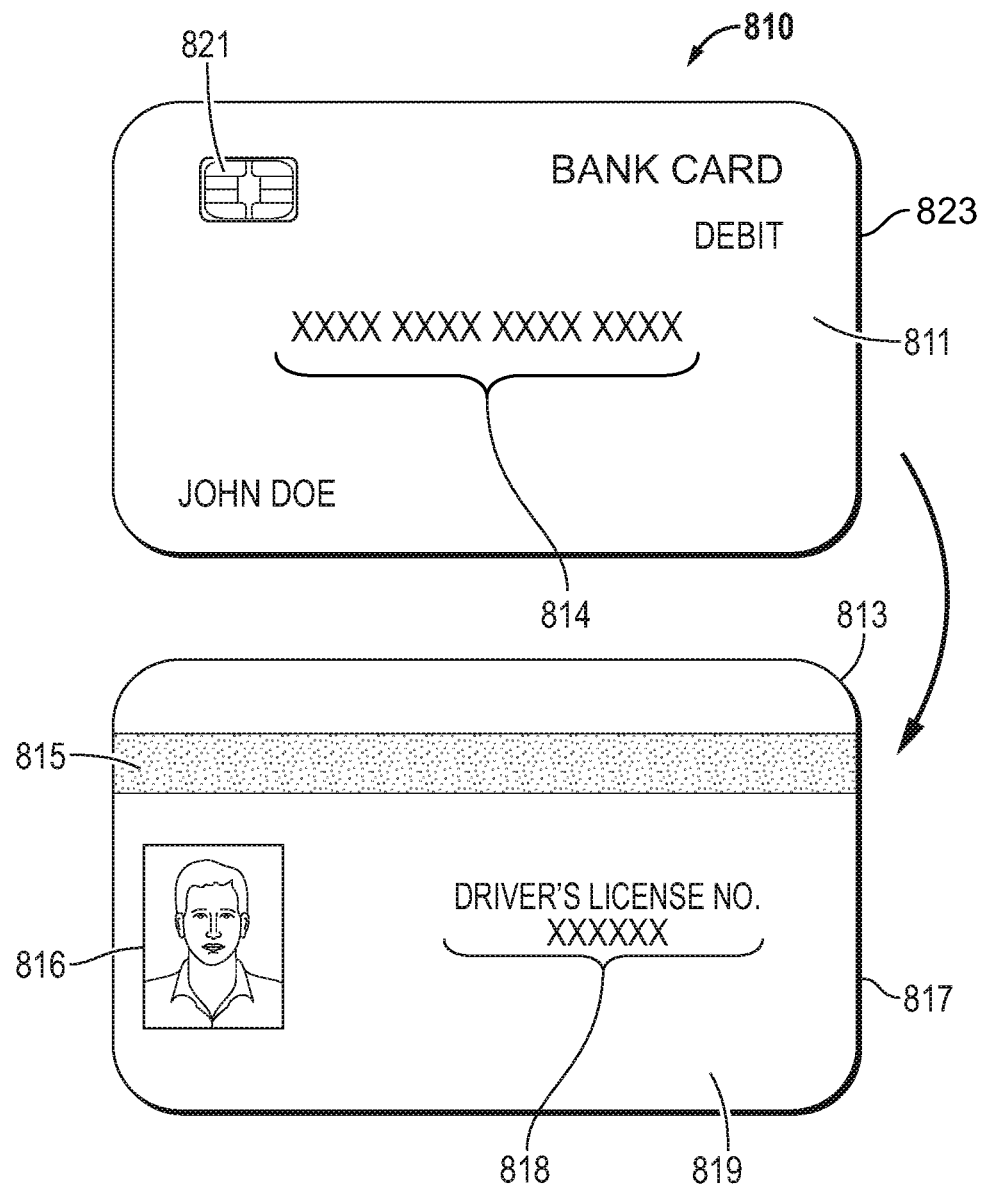
FIG. 8 shows illustrative apparatus in accordance with principles of the disclosure.

FIG. 8 shows illustrative smart card 810. Smart card 810 includes first face 823. Smart card 810 includes second face 817. First face 823 and second face 817 may be opposing faces of smart card 810. First face 823 and second face 817 may be spaced apart from each other by a thickness, such as thickness 413 (shown in FIG. 4). First face 823 includes electrical contact 821. Electrical contact 821 may provide a contact for charging a battery of smart card 810. Electrical contact 821 may provide an access port for a wired connection to smart card 810. Electrical contact 821 may be utilized by a chip reader (such as chip reader 705, shown in FIG. 7) to read sensitive data stored on smart card 810.

First face 823 may include an array of OLEDs that form first display 811. Smart card 810 is shown displaying sensitive data 814 formatted as a credit card number on first display 811. An edge-node, such as merchant POS terminal 701 (shown in FIG. 7) may expect to receive sensitive formatted as a credit card number. Credit card number 814 displayed on first display 811 may be a one-time public representation of sensitive data. A one-time public representation may only be used for a single transaction.

First display 811 is shown presenting information that appears on conventional credit cards, such a holder's name, and issuer associated with the card. In some embodiments, smart card 810 may restrict display of such information. First display 811 shows that a display may present sensitive data in a conventional format associated with tangible credit cards.

Second face 817 may include an array of OLEDs that form second display 819. Second display 819 is shown presenting information formatted as a driver's license. Second display 819 is shown presenting user picture 816, driver's license number 818 and bar code 815. Smart card 810 may be configured to display sensitive data in any suitable format on first display 811 or second display 819.

Figure 9:
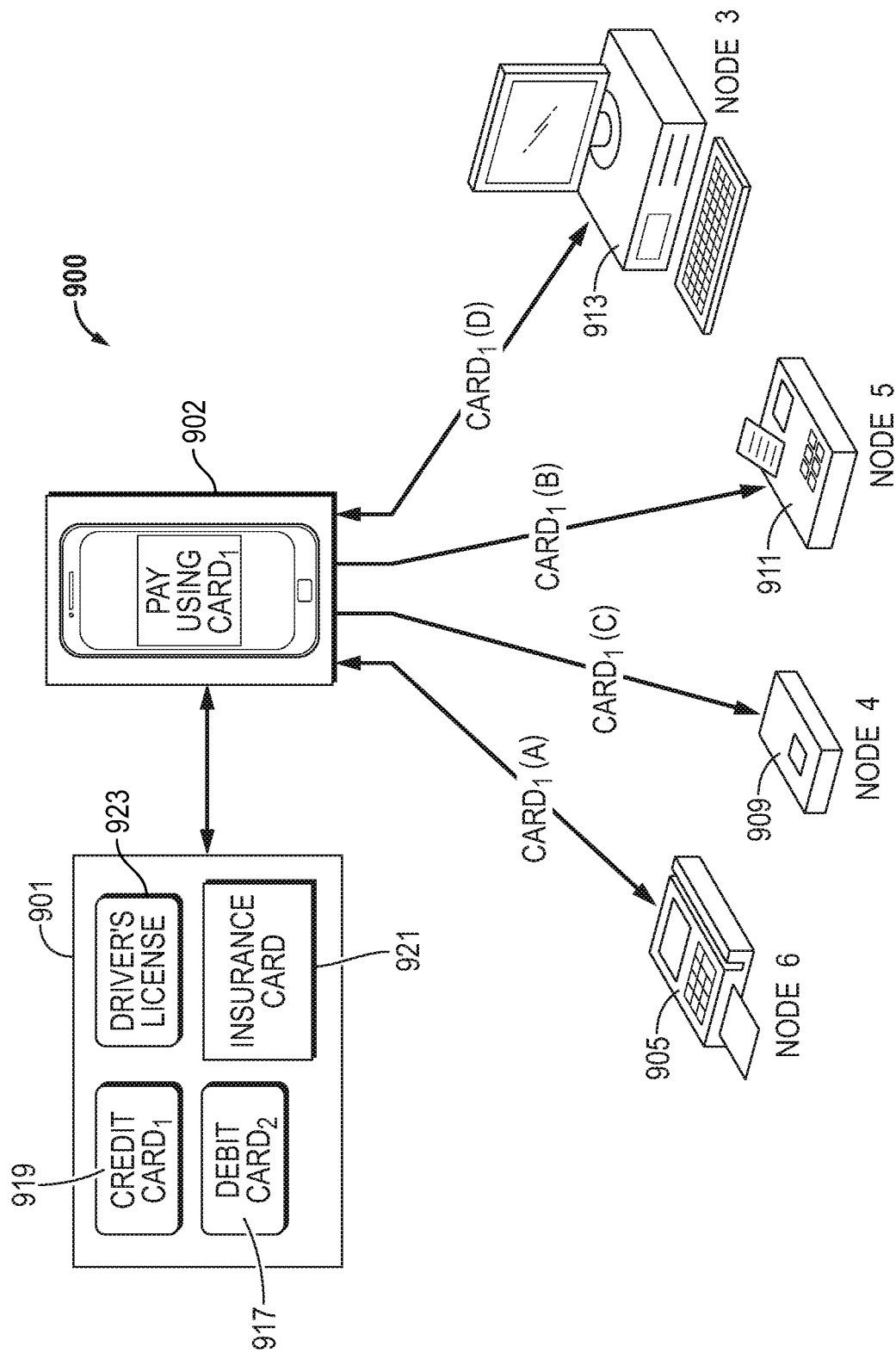
FIG. 9 shows an illustrative system and scenario in accordance with principles of the disclosure.

FIG. 9 shows illustrative apparatus 900. Apparatus 900 includes smart card 901. Smart card 901 includes sensitive data associated with credit card 919, debit card 917, insurance card 921 and driver's license 923. Sensitive data may be pushed to smart card 901 via a cloud computing environment, such as cloud computing environment 306 (shown in FIG. 3) or 709 (shown in FIG. 7). Sensitive data may be pushed to smart card 901 via a mobile device paired to smart card 901, such as mobile device 902.

Smart card 901 may receive requests for sensitive data via mobile device 902. Mobile device 902 may be an edge-node configured to authorize requests for sensitive data. Mobile device 902 may authorize requests received from node 905, node 909, node 911 or node 913. In response to receiving a request for sensitive data, mobile device 902 may utilize data from one or more sensors to determine a legitimacy of the request.

For example, mobile device 902 may confirm that a node requesting insurance card information 921 is in a location associated with a wellness center, pharmacy or other business that would be expected to request insurance card information 921. Mobile device 902 may confirm that it is located in a location associated with a wellness center. Mobile device 902 may prompt for biometric or password authentication before authorizing transmission or display of sensitive data stored on smart card 901.

After authorizing a request for sensitive data, mobile device 902 may instruct smart card 901 to present or transmit sensitive data stored on smart card 901. Smart card 901 may provide a one-time public representation of sensitive data. In some embodiments, smart card 901 may only communicate with mobile device 902. Mobile device 902 may communicate sensitive data received from smart card 901 to a requesting node. In some embodiments, mobile device 902 may activate sensitive data stored on smart card 901, and smart card 901 may communicate the activated sensitive data directly to a requesting node.

Thus, apparatus and methods for ORGANIC LIGHT EMITTING DIODE ("OLED") SINGLE-USE PAYMENT INSTRUMENT are provided. Persons skilled in the art will appreciate that the present disclosure can be practiced by other than the described embodiments, which are presented for purposes of illustration rather than of limitation. The present disclosure is limited only by the claims that follow.

What is claimed is:

1. A smart card comprising:
   a thickness that is not greater than 0.25 mm and having a surface area that is at least 90% of 85.60 mm×53.98 mm;
   a battery that is not greater than 0.8 mm thick;
   a communication circuit configured to establish a communication link between the smart card and a mobile device paired to the smart card; and
   a processor circuit comprising a non-tangible memory and a processor, the processor circuit having a thickness that is not greater than 0.25 mm and the non-transitory memory storing computer executable instructions that when executed by the processor:
      detect removal of the smart card from a wallet;
      establish a communication link to the mobile device;
      based on a location of the mobile device, activate first sensitive data stored on the smart card;
      in response to a request for the first sensitive data received from a terminal within a predetermined distance of the mobile device, transmit the activated first sensitive data to the terminal;
      in response to receiving an override instruction from the mobile device to activate otherwise inactive second sensitive data stored on the smart card, activate the second sensitive data stored on the smart card in anticipation of receiving a request for the second sensitive data from the terminal; and
      in response to determining that the terminal is within a predetermined distance of the mobile device and receiving the request for the second sensitive data within a predetermined time of activation of the second sensitive data, transmit the second sensitive data to the terminal.

2. The smart card of claim 1, wherein the computer executable instructions when executed by the processor activate one or both of the first and second sensitive data by generating a one-time code based on the first or second sensitive data and transmit the one-time code to the terminal.

3. The smart card of claim 2, wherein the terminal is a point-of-sale terminal at a merchant location and the one-time code is formatted as a credit card number.

4. The smart card of claim 1, further comprising an electrical contact, wherein, in operation, electrical charge is transferred from the terminal to the battery via the electrical contact.

5. The smart card of claim 1, wherein the smart card is configured to transmit one or both of the first and second activated sensitive data by illuminating a face of the smart card in a predetermined pattern for a predetermined amount of time.

6. The smart card of claim 1, further comprising a gyroscope that detects when the smart card is removed from the wallet.

7. The smart card of claim 1, further comprising a heat sensor that detects when the smart card is removed from the wallet.

8. The smart card of claim 1, wherein when the smart card is unable to establish the communication link with the mobile device within a predetermined time interval, the smart card is configured to purge one or both of the first and second sensitive data stored on the smart card.

9. The smart card of claim 1, wherein when the processor circuit determines that the battery comprises less than a threshold amount of charge, the smart card is configured to purge one or both of the first and second sensitive data stored on the smart card.

10. A smart card comprising:
    an array of organic light emitting diodes ("OLEDs") forming one or more pixels visible on a face of the smart card, the array of OLEDs having a surface area that is at least 90% of 85.60 mm×53.98 mm;
    a battery that is not greater than 0.8 mm thick;
    a communication circuit configured to periodically establish a communication link between the smart card and a mobile device paired to the smart card;
    a designated chipset storing encrypted sensitive data; and
    a processor circuit comprising a non-tangible memory and a processor, the processor circuit having a thickness that is not greater than 0.25 mm and the non-transitory memory storing computer executable instructions that when executed by the processor:
       receive a request for the sensitive data stored in the designated chip;
       based on a location of the mobile device, generate an instance of the sensitive data; and
       present the instance of the sensitive data on a face of the smart card by controlling illumination of the one or more pixels within the array of OLEDs;
    wherein the sensitive data is first sensitive data, and the computer executable instructions when executed by the processor:
       receive an override instruction from the mobile device to activate otherwise inactive second sensitive data stored in the designated chip;
       based on the override instruction, generate an instance of the second sensitive data; and
       in response to determining that the mobile device is within a predetermined distance of the location and receiving the request for the second sensitive data within a predetermined time of activation, present the instance of the second sensitive data on a face of the smart card by controlling illumination of the one or more pixels within the array of OLEDs.

11. The smart card of claim 10, wherein one or both of the instances of the first and second sensitive data is usable to initiate a purchase transaction at a merchant point-of-sale terminal.

12. The smart card of claim 10, wherein one or both of the instances of the first and second sensitive data is formatted as a driver's license.

13. The smart card of claim 10, wherein one or both of the instances of the first and second sensitive data is formatted as a passport.

14. The smart card of claim 10, wherein the processor limits one or both of the first and second sensitive data presented by the array of OLEDs to being presented at a target geographic location.

15. The smart card of claim 14, wherein, the smart card is configured to accept an override request to adjust the target geographic location.

16. A method for securing sensitive data, the method comprising:
- storing first and second sensitive data on a designated chipset embedded in a smart card, wherein the second sensitive data is otherwise inactive;
- maintaining the storing of the first and second sensitive data as long as the smart card remains paired to a mobile device;
- in response to a request for the first sensitive data received from a terminal:
  - receiving confirmation from the mobile device that the request is authorized; and
  - generating a one-time public representation of the first sensitive data;
- in response to an override instruction from the mobile device to activate the second sensitive data:
  - activating the second sensitive data; and
  - in response to determining that the terminal is within a predetermined distance of the mobile device and receiving a request for the second sensitive data within a predetermined time of activation, generating a one-time public representation of the second sensitive data; and
- when the smart card is unable to pair with the mobile device for a predetermined period of time, purging the first and second sensitive data stored on the smart card.

17. The method of claim 16 wherein the generating the one-time public representation of one or both of the first sensitive data and second sensitive data is achieved by illuminating pixels within an array of organic light emitting diodes.

18. The method of claim 16, further comprising, in response to the request for the first sensitive data generating an authorization code on the mobile device; wherein, the one-time public representation of the sensitive data is not usable without the authorization code.

19. The method of claim 16 wherein the confirmation from the mobile device comprises validation of a biometric credential presented to the mobile device.

* * * * *